(12) United States Patent
Watanabe

(10) Patent No.: US 7,099,250 B2
(45) Date of Patent: Aug. 29, 2006

(54) INFORMATION RECORDING AND REPRODUCING METHOD AND INFORMATION RECORDING AND REPRODUCING DEVICE

(75) Inventor: Yoshiju Watanabe, Naka (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 164 days.

(21) Appl. No.: 10/930,858

(22) Filed: Sep. 1, 2004

(65) Prior Publication Data

US 2005/0028042 A1 Feb. 3, 2005

Related U.S. Application Data

(63) Continuation of application No. 09/641,922, filed on Aug. 21, 2000, now Pat. No. 6,829,206.

(30) Foreign Application Priority Data

Feb. 18, 2000 (JP) .............................. P00-046702

(51) Int. Cl.
*G11B 11/03* (2006.01)
(52) U.S. Cl. ................. 369/53.12; 369/53.35
(58) Field of Classification Search ............... None
See application file for complete search history.

(56) References Cited

U.S. PATENT DOCUMENTS 5,233,584 A 8/1993 Kulakowski et al.
5,469,546 A 11/1995 Hosoya
5,721,717 A 2/1998 Obata et al.
5,870,356 A 2/1999 Ikeda
6,519,210 B1 2/2003 Ikeda et al.
6,611,392 B1 8/2003 Hasebe
6,625,096 B1 9/2003 Arai

OTHER PUBLICATIONS

Patent Abstracts of Japan, JP Publication No. 10-124262, publication date May 15, 1998.
Patent Abstracts of Japan, JP Publication No. 11-007706, publication date Jan. 12, 1999.
Patent Abstracts of Japan, JP Publication No. 05-325434, publication date Dec. 10, 1993.

*Primary Examiner*—Paul W. Huber
(74) *Attorney, Agent, or Firm*—Antonelli, Terry, Stout and Kraus, LLP.

(57) ABSTRACT

When an error requiring a retry operation occurs, information concerning the error is stored every time. The information includes a sector number (or beginning sector number and number of sectors), the content of the command; a write or read designation, and the number of the times of error occurrence in the sector (or number of the times of retry operation), for example. In the case of recording information, like the prior art, information to be written which is stored in a buffer memory is held as is. Since the information concerning an error requiring a retry operation is stored, even though that error occurs repeatedly, a write and/or read operation of the next executable command to another track is executed without immediately switching to the retry operation. Thus, other commands are executed between the occurrence of the error requiring a retry operation and actual execution of the retry operation.

10 Claims, 14 Drawing Sheets

X : Occurrence of error requiring retry

X : Occurrence of error requiring retry

FIG.8

| NO. | Content of processing | Processing time [ms] | Accumulated processing time [ms] |
|---|---|---|---|
| 1 | Processing of sector 15 finished | | 0.0 |
| 2 | Seek to track 5 | 2.0 | 2.0 |
| 3 | Rotational delay time at track 5 | 0.4 | 2.4 |
| 4 | Processing of sector 16, generate 1st retry command | 0.1 | 2.5 |
| 5 | Sort processing of command | 0.2 | 2.7 |
| 6 | Seek to track 4 | 2.0 | 4.7 |
| 7 | Rotational delay time at track 4 | 2.7 | 7.4 |
| 8 | Processing of sector 18 | 0.1 | 7.5 |
| 9 | Seek to track 5 | 2.0 | 9.5 |
| 10 | Rotational delay time at track 5 | 2.9 | 12.4 |
| 11 | 1st retry processing of sector 16, generate retry command | 0.1 | 12.5 |
| 12 | Sort processing of command | 0.2 | 12.7 |
| 13 | Seek to track 4-1 | 2.0 | 14.7 |
| 14 | Rotational delay time at track 4-1 | 2.7 | 17.4 |
| 15 | Processing of sector 18-1 | 0.1 | 17.5 |
| 16 | Seek to track 5 | 2.0 | 19.5 |
| 17 | Rotational delay time at track 5 | 2.9 | 22.4 |
| 18 | 2nd retry processing of sector 16, generate retry command | 0.1 | 22.5 |
| 19 | Sort processing of command | 0.2 | 22.7 |
| 20 | Seek to track 4-2 | 2.0 | 24.7 |
| 21 | Rotational delay time at track 4-2 | 2.7 | 27.4 |
| 22 | Processing of sector 18-2 | 0.1 | 27.5 |
| 23 | Seek to track 5 | 2.0 | 29.5 |
| 24 | Rotational delay time at track 5 | 2.9 | 32.4 |
| 25 | 3rd retry processing of sector 16, generate retry command | 0.1 | 32.5 |
| 26 | Sort processing of command | 0.2 | 32.7 |
| 27 | Seek to track 4-3 | 2.0 | 34.7 |
| 28 | Rotational delay time at track 4-3 | 2.7 | 37.4 |
| 29 | Processing of sector 18-3 | 0.1 | 37.5 |
| 30 | Seek to track 5 | 2.0 | 39.5 |
| 31 | Rotational delay time at track 5 | 2.9 | 42.4 |
| 32 | 4th retry processing of sector 16, generate retry command | 0.1 | 42.5 |
| 33 | Sort processing of command | 0.2 | 42.7 |
| 34 | Seek to track 4-4 | 2.0 | 44.7 |
| 35 | Rotational delay time at track 4-4 | 2.7 | 47.4 |
| 36 | Processing of sector 18-4 | 0.1 | 47.5 |
| 37 | Seek to track 5 | 2.0 | 49.5 |
| 38 | Rotational delay time at track 5 | 2.9 | 52.4 |
| 39 | 5th retry processing of sector 16, generate retry command | 0.1 | 52.5 |
| 40 | Seek to track 4-5 | 2.0 | 54.5 |
| 41 | Rotational delay time at track 4-5 | 2.9 | 57.4 |
| 42 | Processing of sector 18-5 | 0.1 | 57.5 |

FIG.9

| NO. | Content of processing | Processing time [ms] | Accumulated processing time [ms] |
|---|---|---|---|
| 1 | Processing of sector 15 finished |  | 0.0 |
| 2 | Seek to track 5 | 2.0 | 2.0 |
| 3 | Rotational delay time at track 5 | 0.4 | 2.4 |
| 4 | Processing of sector 16 | 0.1 | 2.5 |
| 5 | Rotational delay time at track 5 | 9.9 | 12.4 |
| 6 | 1st retry processing of sector 16 | 0.1 | 12.5 |
| 7 | Rotational delay time at track 5 | 9.9 | 22.4 |
| 8 | 2nd retry processing of sector 16 | 0.1 | 22.5 |
| 9 | Rotational delay time at track 5 | 9.9 | 32.4 |
| 10 | 3rd retry processing of sector 16 | 0.1 | 32.5 |
| 11 | Rotational delay time at track 5 | 9.9 | 42.4 |
| 12 | 4th retry processing of sector 16 | 0.1 | 42.5 |
| 13 | Rotational delay time at track 5 | 9.9 | 52.4 |
| 14 | 5th retry processing of sector 16 | 0.1 | 52.5 |
| 15 | Sort processing of command | 0.8 | 53.3 |
| 16 | Seek to track 4 | 2.0 | 55.3 |
| 17 | Rotational delay time at track 4 | 2.1 | 57.4 |
| 18 | Processing of sector 18 | 0.1 | 57.5 |
| 19 | Seek to track 4-1 | 1.0 | 58.5 |
| 20 | Rotational delay time at track 4-1 | 8.9 | 67.4 |
| 21 | Processing of sector 18-1 | 0.1 | 67.5 |
| 22 | Seek to track 4-2 | 1.0 | 68.5 |
| 23 | Rotational delay time at track 4-2 | 8.9 | 77.4 |
| 24 | Processing of sector 18-2 | 0.1 | 77.5 |
| 25 | Seek to track 4-3 | 1.0 | 78.5 |
| 26 | Rotational delay time at track 4-3 | 8.9 | 87.4 |
| 27 | Processing of sector 18-3 | 0.1 | 87.5 |
| 28 | Seek to track 4-4 | 1.0 | 88.5 |
| 29 | Rotational delay time at track 4-4 | 8.9 | 97.4 |
| 30 | Processing of sector 18-4 | 0.1 | 97.5 |
| 31 | Seek to track 4-5 | 1.0 | 98.5 |
| 32 | Rotational delay time at track 4-5 | 8.9 | 107.4 |
| 33 | Processing of sector 18-5 | 0.1 | 107.5 |

FIG.10

| NO. | Content of processing | Processing time [ms] | Accumulated processing time [ms] |
|---|---|---|---|
| 1 | Processing of sector 15 finished |  | 0.0 |
| 2 | Seek to track 5 | 2.0 | 2.0 |
| 3 | Rotational delay time at track 5 | 0.4 | 2.4 |
| 4 | Processing of sector 16 | 0.1 | 2.5 |
| 5 | Sort processing of command | 0.2 | 2.7 |
| 6 | Seek to track 4 | 2.0 | 4.7 |
| 7 | Rotational delay time at track 4 | 2.7 | 7.4 |
| 8 | Processing of sector 18 | 0.1 | 7.5 |
| 9 | Stand by at track 4 | 4.8 | 12.3 |
| 10 | Command receipt processing | 0.2 | 12.5 |
| 11 | Seek to track 4-1 | 1.0 | 13.5 |
| 12 | Rotational delay time at track 4-1 | 3.9 | 17.4 |
| 13 | Processing of sector 18-1 | 0.1 | 17.5 |
| 14 | Stand by at track 4-1 | 4.8 | 22.3 |
| 15 | Command receipt processing | 0.2 | 22.5 |
| 16 | Seek to track 4-2 | 1.0 | 23.5 |
| 17 | Rotational delay time at track 4-2 | 3.9 | 27.4 |
| 18 | Processing of sector 18-2 | 0.1 | 27.5 |
| 19 | Stand by at track 4-2 | 4.8 | 32.3 |
| 20 | Command receipt processing | 0.2 | 32.5 |
| 21 | Seek to track 4-3 | 1.0 | 33.5 |
| 22 | Rotational delay time at track 4-3 | 3.9 | 37.4 |
| 23 | Processing of sector 18-3 | 0.1 | 37.5 |
| 24 | Stand by at track 4-3 | 4.8 | 42.3 |
| 25 | Command receipt processing | 0.2 | 42.5 |
| 26 | Seek to track 4-4 | 1.0 | 43.5 |
| 27 | Rotational delay time at track 4-4 | 3.9 | 47.4 |
| 28 | Processing of sector 18-4 | 0.1 | 47.5 |
| 29 | Stand by at track 4-4 | 4.8 | 52.3 |
| 30 | Command receipt processing | 0.2 | 52.5 |
| 31 | Seek to track 4-5 | 1.0 | 53.5 |
| 32 | Rotational delay time at track 4-5 | 3.9 | 57.4 |
| 33 | Processing of sector 18-5 | 0.1 | 57.5 |

INFORMATION RECORDING AND REPRODUCING METHOD AND INFORMATION RECORDING AND REPRODUCING DEVICE

CROSS-REFERENCE TO RELATED APPLICATIONS

This is a continuation of U.S. application Ser. No. 09/641,922 filed 21 Aug. 2000, now U.S. Pat. No. 6,829,206 B1,the contents of which is incorporated herein by reference in its entirety.

BACKGROUND OF THE INVENTION

The present invention relates to an information recording and reproducing device having a disk recording medium. More particularly, the present invention relates to a method of recording and reproducing information efficiently when an error which requires a retry operation occurs during random access to the information, and relates to an information recording and reproducing device which employs the method.

A hard disk drive is a typical example of an information recording and reproducing device which has a disk recording medium. The hard disk drive is an information recording and reproducing device which records information on a disk magnetic recording medium as magnetization reversals and reproduces information recorded as magnetization reversals by detecting magnetic flux changes. The access time, in which a recording and reproducing head of the information recording and reproducing device accesses to an arbitrary sector, comprises a seek time, in which a seek operation is executed, and rotational delay time, in which the systems waits for the target sector to come under the recording and reproducing head during rotation of the disk medium. It is important to decrease the access time in order to quickly record and reproduce information.

In order to decrease the access time, JP-A-08-329589 discloses a method of accumulating write or read commands in a command queue and sorting the command queue to minimize the rotational delay time of the disk when an error requiring a retry operation does not occur. However, in practice, even though an error occurs in writing or reading information and a retry operation (re-execution of the command) is required, it is important also to reduce the idle waiting time required for a retry operation to improve performance of the disk device.

As an another method to decrease the access time, JP-A-10-124262 discloses a method in which a marginal time which is available for a retry operation is estimated and retry parameters are selected according to the value of this marginal time if an error requiring a retry operation occurs. However, this method is merely an improvement of the above-described example of the conventional technology with regard to a method of setting retry parameters. Namely, for example, it becomes possible to select the number of retry times corresponding to the marginal time by this method.

Further, JP-A-05-325434 discloses a method in which sectors succeeding the error sector are read out and afterward the sector in which an error has occurred is re-read to decrease the rotational delay time, if an error requiring a retry operation occurs in a sector at the time of reading out information from two or more sectors of the hard disk drive.

Besides, JP-A-11-7706 discloses a method in which sectors succeeding the error sector are read out in precedence to decrease the processing time if an error requiring a retry operation occurs while reading out information from two or more sectors within one track in an optical disk device.

According to these methods, when an error requiring a retry operation occurs, the idle rotational delay time can be decreased by reading out successive sectors in precedence. Namely, these methods disclosed in known examples are effective at reading out information from two or more successive sectors on the same track.

SUMMARY OF THE INVENTION

However, in the case of a random access to information which is characteristics of the information recording and reproducing device using a disk recording medium, namely, in the case of random access to information included in different tracks, these methods cannot be applied.

Besides, in these methods, when information cannot be correctly read out at a first retry operation, the retry operation is repeated within a restricted time for retry processing. In the repeated retry operation, since the processing of these sectors having no error has been finished, only a retry operation is executed. Moreover, a process flow is employed in which process control does not execute the next command until the restricted time or restricted number of times is exceeded. Therefore, the second or later retry operation requires a rotational delay time of about one revolution time at one retry operation as in the conventional process.

In a case where information is recorded and reproduced using a disk information recording medium, if an error requiring a retry operation occurs, it becomes important to decrease the rotational delay time at the retry operation in order to decrease the access time. A method, in which marginal time which is available for a retry operation is estimated and retry parameters can be selected, is disclosed in the above-referenced JP-A-10-124262. However, this method does not provide an improved means for reduction of the rotational delay time at the retry operation, which is similar to the conventional method. Therefore, in this method, a rotational delay time also occurs at the retry operation, and so it is not possible to decrease the rotational delay time.

Other methods in which successive sectors are read out in precedence before first retry operation are disclosed in JP-A-05-325434 and JP-A11-7706. However, these methods do not provide an effective way to solve the problem for decreasing the rotational delay time in the recording and reproducing of information in random sectors, especially in a case where two or more retry operations are required.

Thus, in recording and reproducing information in random sectors on a disk medium, when an error requiring a retry operation occurs repeatedly, there is a problem that an idle time of about one revolution time occurs in every repetition of the retry operation in the second or subsequent retry operation, and so the performance of recording and reproducing the information is deteriorated.

A first feature of the present invention is characterized in that, when an error requiring a retry operation occurs repeatedly, information concerning the error is stored at every occurrence of the error. This information contains a sector number (or beginning sector number and number of sectors), the content of the command for recording or reproducing, the number of times the error has occurred in the sector (or the number of times a retry operation has occurred), for example. In the case of recording information, information to be written which is stored in a buffer memory is also held as it is. Then, by storing the information concerning an error requiring a retry operation, when an error requiring a retry operation occurs repeatedly, a write or read operation of the next executable different command to another track is executed without immediately switching to the retry operation.

A second feature of the present invention is characterized in that an information recording and reproducing device, which is provided with a command queue holding write commands or read commands, regenerates a command by using information concerning an error requiring a retry operation and the original write/read command to store the information concerning the error requiring the retry operation. This command also contains, for example, a sector number (or beginning sector number and a number of sectors), the content of the command for recording or reproducing, the number of times of occurrence of the error in the sector (or the number of times the retry operation has occurred). This new generated command is added to the command queue. After being added to the command queue, the new command is treated the same as other commands.

Further, a third feature of the present invention is characterized in that priority to execute a command is added to the new command generated from the information concerning the error requiring a retry operation.

BRIEF DESCRIPTION OF THE DRAWINGS

FIG. 8 is a table showing an example of command execution flow and processing time in the operation executed by the present invention, in which five retry operations and five commands are added to the case of FIG. 6.

FIG. 9 is a table showing an example of command execution flow and processing time in a case where an example of the operation in FIG. 8 is executed by a conventional method.

FIG. 10 is a table showing an example of command execution flow and processing time in an operation without a retry operation to sector 16 in the example of the operation in FIG. 8.

DESCRIPTION OF THE PREFERRED EMBODIMENTS

Figure 1:
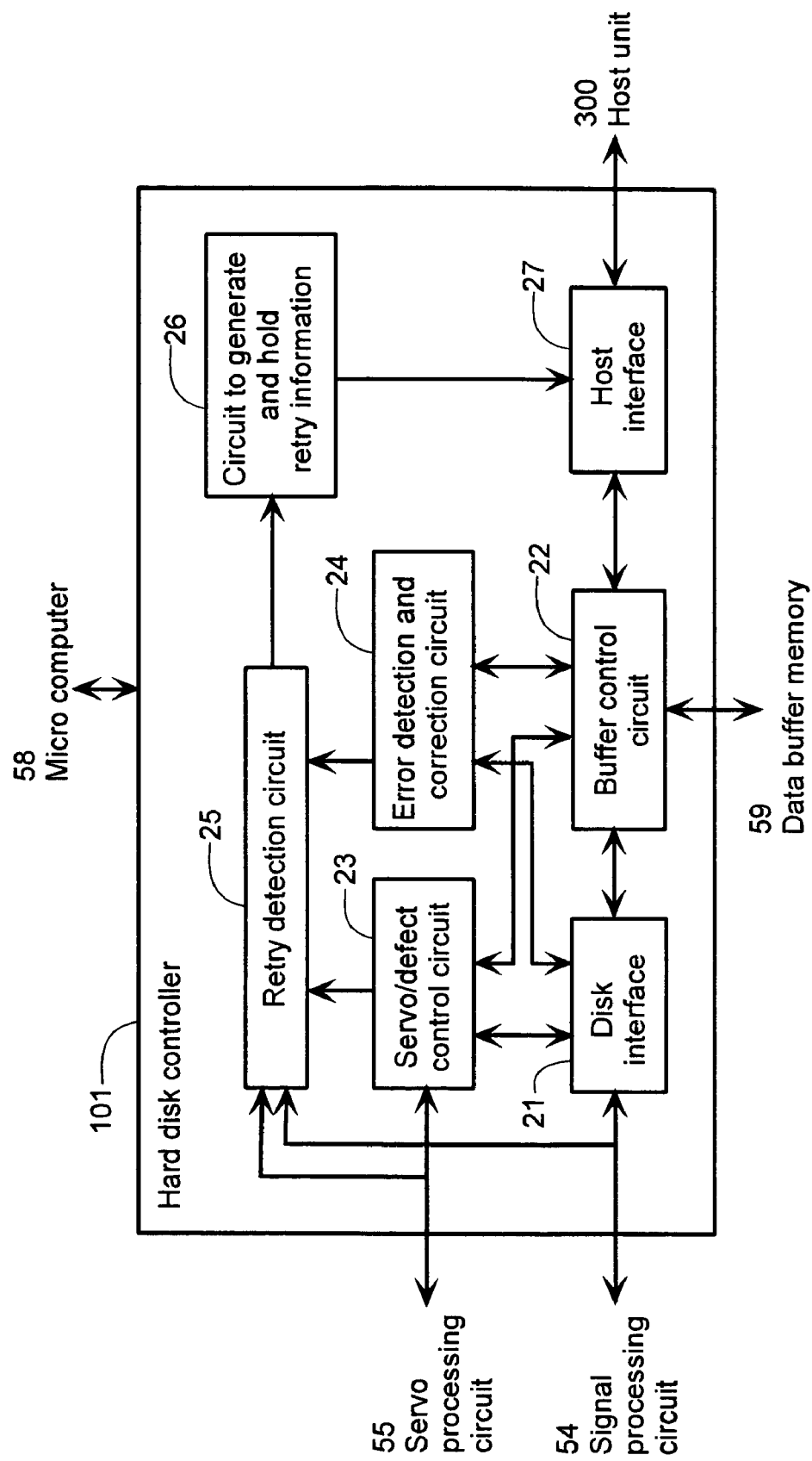
FIG. 1 is a block diagram of a hard disk controller which represents an embodiment of the present invention.

Hard disk drives representing embodiments of the present invention will be described with reference to FIGS. 1, 2 and 16.

Figure 16:
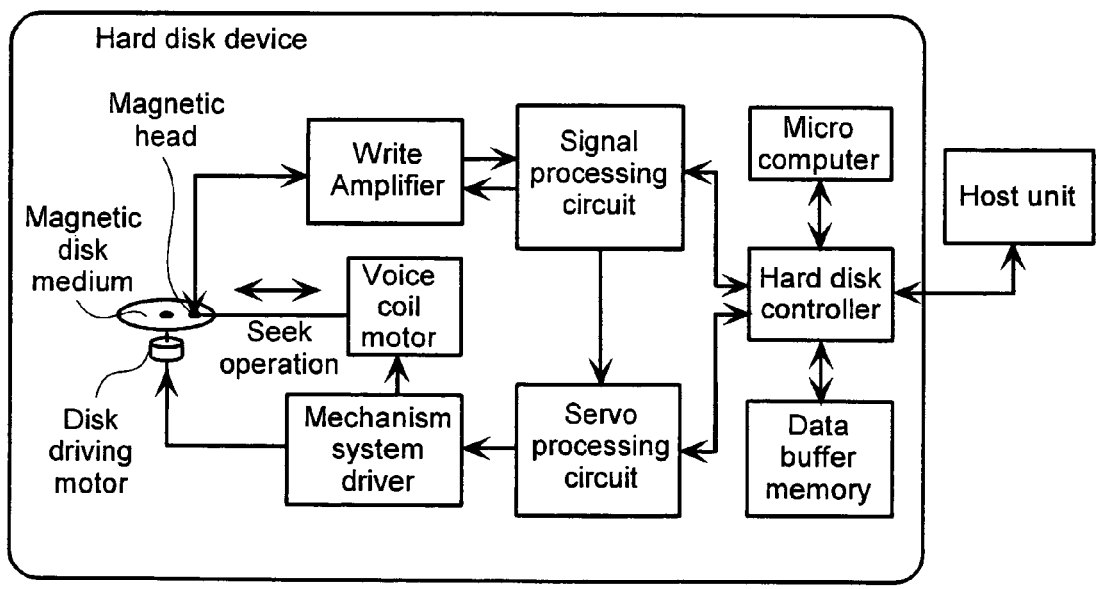
FIG. 16 is a block diagram of a hard disk drive which represents an embodiment of the present invention.

FIG. 16 is an example of the constitution of a hard disk drive which is connected to a host unit 300 and executes recording and reproducing of information. The hard disk drive 201 comprises a disk driving motor 50, a magnetic disk medium 51 which records information, a magnetic head 52 which records and reproduces information, a read/write amplifier 53 which amplifies and buffers signals, a signal processing circuit 54 which writes and reads information, a servo processing circuit 55 which executes positioning control, a mechanism system driver 56 which moves the mechanism, a voice coil motor 57 by which head 52 is made to seek, a hard disk controller 101 which controls these components, a micro-computer 58 in which a program that controls the operation of the hard disk controller 101 is executed, and a data buffer memory 59 which stores temporally information to be transferred to and from the host unit 300.

In this device, information is written and read with a definite unit, and this unit is called a sector. The sector is placed on an area of one of a plurality of concentric circles on the disk medium, which are called tracks. Two or more successive sectors on the medium are called a block. The head which writes information on the disk medium and reads information from the disk medium can perform a seeking operation in which the head is moved nearly in the radius direction of the disk medium by an actuator mechanism. Further, when information is written or read, the disk medium is rotating at high speed; therefore, the head for recording and reproducing can access an arbitrary sector on an arbitrary track on the disk medium and can write and read information by the seeking operation and the rotation of the disk medium.

At first, the first hard disk controller, which represents an embodiment of the present invention, will be described with reference to FIG. 1. The hard disk controller 101 comprises a disk interface 21, which controls input and output of write data or read data to and from the signal processing circuit 54, which processes a signal in writing and reading data; a buffer control circuit 22, which controls the transmitting and receiving of data to and from the data buffer memory 59, which temporarily stores data to be written to the disk medium or data to be read from the disk medium; a servo/defect control circuit 23, which manages the usable area for writing and reading data and controls sectors for writing and reading by controlling the timings to process data in a servo portion on which servo signals for seeking and following operations of the head to write and read data are written, and by controlling operations so as to process only usable sectors, omitting sectors which are registered as defect sectors to avoid defects on the disk medium; an error detection and correction circuit 24, which generates redundant data at the time of writing data to detect and correct error data, and detects and corrects data errors at the time of reading data by using the read data and the redundant data added to detect and correct error data; and a host interface 27, which receives a command for writing or reading data from the host unit 300 and controls the receipt or transmission of write data or read data according to the command.

This hard disk controller 101 is connected to the above-mentioned signal processing circuit 54, the data buffer memory 59, the servo processing circuit 55 which determines the servo portion on which servo signals for the seek operation and following operation of the head to write and read data is recorded, the microcomputer 58 in which a program that controls the operation of the hard disk controller 101 is executed, and the host unit 300 which issues commands to the hard disk drive to write and read data. The hard disk controller 101 controls the hard disk drive and writes and reads information. Further, the hard disk controller is provided with a retry detection circuit 25 and a circuit to generate and hold retry information 26 that are used for retry processing.

The retry detection circuit 25 inputs signals from various processing circuits, such as the disk interface 21, the servo/defect control circuit 23, the error detection and correction circuit 24, the signal processing circuit 54, and the servo processing circuit 55, and detects the occurrence of an error requiring a retry operation. The occurrence of an uncorrectable error during reading of information, a variation of the write clock during writing of information, and the occurrence of an abnormal operation in various control signals are the factors which represents occurrence of an error requiring a retry operation.

Upon occurrence of an error requiring a retry operation, as detected by the retry detection circuit 25, the circuit 26 to generate and hold retry information generates and holds retry information. The retry information contains the content of writing or reading, a sector number (or beginning sector number and the number of the sectors), and the number of times a retry operation has occurred. Further, when a command is generated to write or read the sector in which the error requiring a retry operation has occurred, priority information in execution of the command to the sector can be added to the retry information.

The retry information generated from the circuit 26 to generate and hold retry information is sent to the host interface 27, and the host interface 27 executes the retry operation when the retry operation becomes executable corresponding to a proper rotational position of the disk. When the error requiring a retry operation occurs again at a sector, the circuit 26 to generate and hold retry information generates and holds the retry information again. Requirements for writing or reading from the host unit 300 are executed in order between the occurrence of the error and the execution of the retry operation. The host interface circuit 27 can change the retry method based on the retry information. Further, when a writing or reading of the sector is to be executed based on the information of the priority order in execution for the sector, the host interface 27 can also determine execution sequence of a writing or reading operation according to the priority order.

Thus, the retry information for the sector in which an error requiring a retry operation has occurred remains in the circuit 26 to generate and hold retry information until the error is recovered within the allowable limits of the retry operation, and the retry is executed to the sector. Even in a recovering process, the requirement for writing or reading from the host unit 300 is executed at any time if it is executable. During a rotational delay time in the retry operation, other requirements for writing and reading are executed; therefore, throughput of the whole disk device to the requirement for writing and reading is improved.

Figure 2:
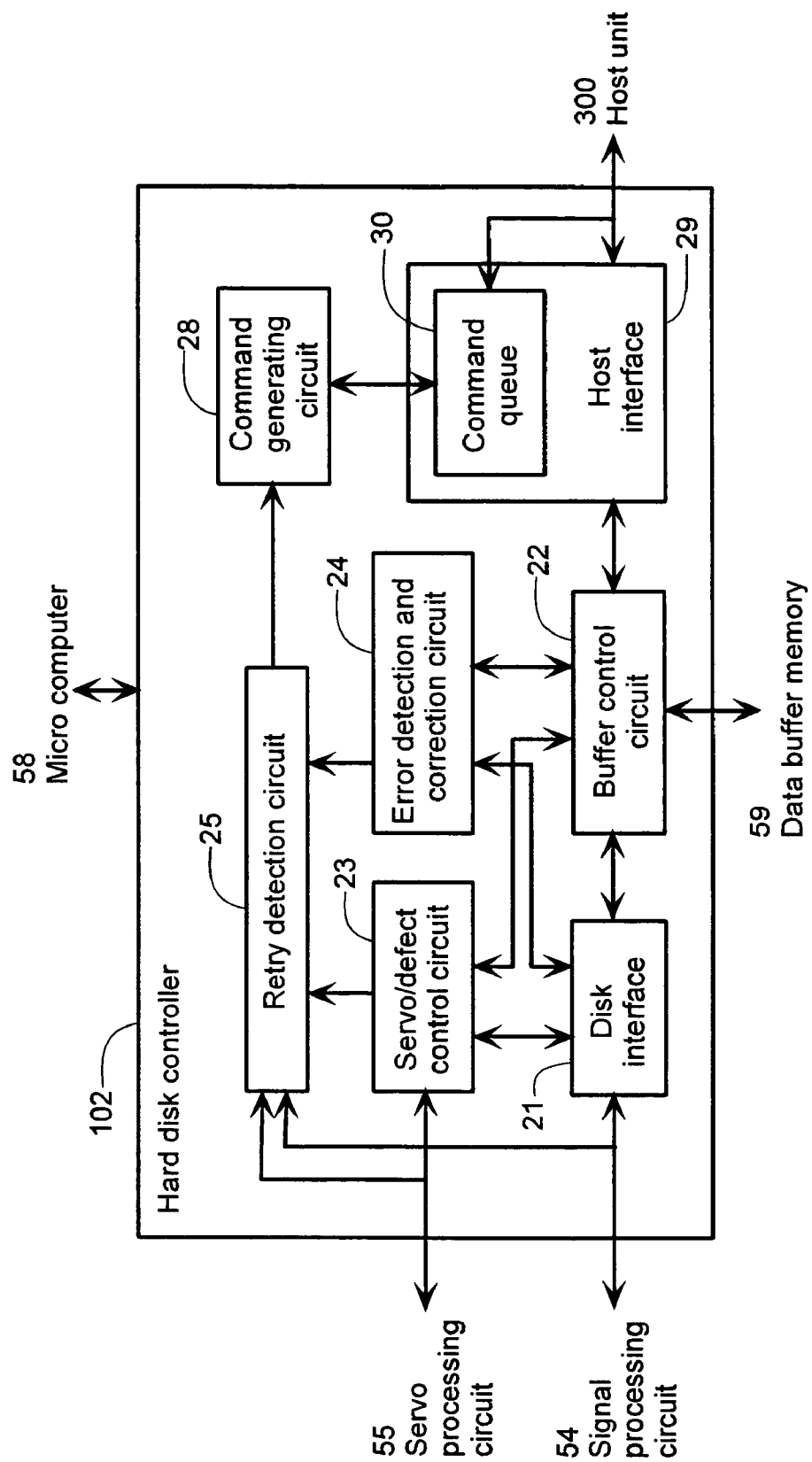
FIG. 2 is a block diagram of a hard disk controller which represents another embodiment of the present invention.

FIG. 2 shows the constitution of a second hard disk controller which represents another embodiment of the present invention. In a hard disk controller 102 in FIG. 2, except for a command generating circuit 28 and a host interface 29, the elements are common to the controller in FIG. 1. The circuits with the same function are represented by the same symbol, and only those parts which are different in constitution from FIG. 1 will be explained.

The hard disk controller 102 has a command generating circuit 28 which generates a new command for a retry operation in response to the occurrence of an error requiring a retry operation, as detected by the retry detecting circuit 25. The new retry command generated by the command generating circuit 28 is sent to the host interface circuit 29 and is stored in the command queue 30 which accumulates commands from the host unit. The retry command generated by the command generating circuit 28 contains the command content (write or read), a sector number (or beginning sector number and the number of sectors), and the number of the times of a retry operation, and the command is formed so that it can be judged that the command has been generated by the command generating circuit 28. Further, the command is constituted so that it can be treated in a similar way to the write command and read command from the host unit 300, and it can be stored in the command queue 30.

In the command queue 30, the priority order of execution of the retry command relative to a write command and read command from the host unit 300 can be determined and the retry method can be changed. Additionally, the execution order of the write command and read command from the host unit 300 can be determined and changed.

As described above, because the write command and read command from the host unit 300 and the retry command are stored together in the command queue 300, it is possible to execute these commands efficiently. For example, even when a new command is given from the host unit 300 during execution of the retry command, it is possible to execute the commands including the new command efficiently. In practice, it is always probable that new write or read commands are sent from the host unit 300, and there is a possibility that these new commands can be also executed during a rotational delay time in the retry operation.

Figure 3:
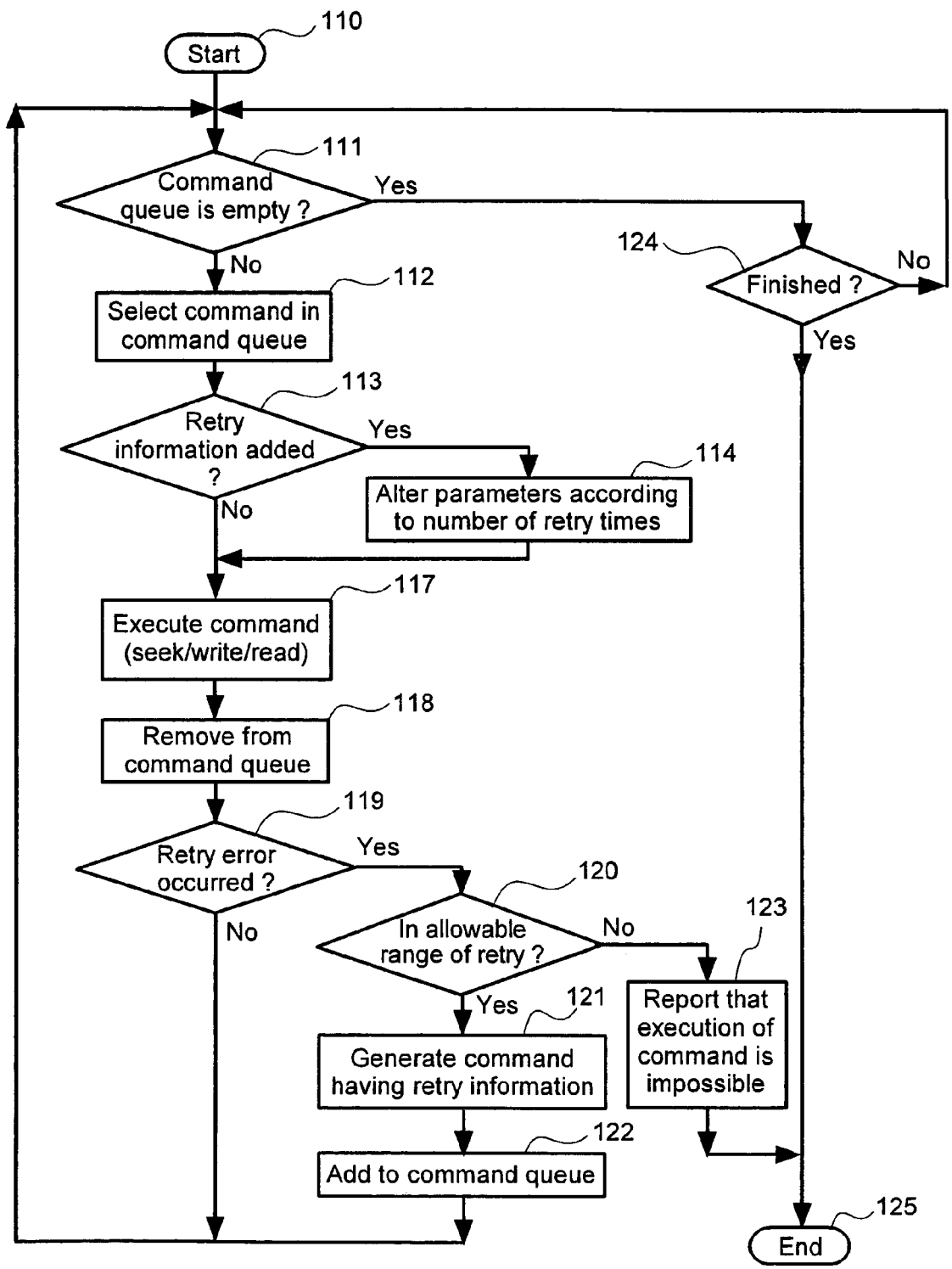
FIG. 3 is a flow chart of a write/read operation in accordance with the present invention including a case of occurrence of an error requiring a retry operation.

The process procedure of the present invention will be explained in detail with reference to FIG. 3. FIG. 3 shows a flow chart which illustrates and example of writing and reading operations according to the present invention, which includes the case in which an error requiring a retry operation occurs.

At step 110, an operation is started. A test is performed at step 111 to determine if any command exists in the command queue. If a command does not exist in the command queue, it is judged at step 124 if the operation has finished, then the operation ends at step 125, or the control goes back to step 111 and repeats a checking of the command queue. If any command exists in the command queue at step 111, a command is selected from the command queue at step 112. Selection of the command is carried out according to a predetermined selection criterion. At the next step 113, a test is performed to determine if the selected command is for a retry operation. If it is for a retry operation, parameters for a retry operation are set at step 114 according to the retry information contained in the command. In order to recover an earlier error requiring a retry operation, it is possible that these parameters can be changed according to the number of retry times.

If the selected command is not for a retry operation at step 113, or if the parameters have been set at step 1 14, the control goes to step 117 and the command is executed. In the execution of the command at step 117, all operations necessary for the execution of the command are performed, such as a seek and write/read operation of the magnetic head, the setting of parameters necessary for these operations, and off-track movement (to move the write/read head intentionally from an original position) during the retry operation. If the command has been executed at step 117, that command is removed from the command queue at step 118. Then, a test is performed at step 119 to determine if an error requiring a retry operation has occurred in the command executed at step 117. If an error requiring a retry operation has not occurred, the control goes back to step 111. If an error requiring a retry operation has occurred, the control goes to step 120.

A test is performed at step 120 to determine if the number of tires and the operation time of the retry operation to the sector, in which an error requiring retry operation has occurred, are within allowable limits. If they are within allowable limits, a retry command which contains retry information is generated at step 121, the command is added to the command queue at step 122, and then the control goes back to step 111. If they are out of the allowable limits, it is reported at step 123 that execution of the command is impossible, and the operation ends at step 125.

In this example, the step 118, in which the command is removed from the command queue, is placed at this position in FIG. 3 to simplify the flow chart; however, the step 118 may be placed at each branch after step 119 in which occurrence of a retry error is examined. Further, the step 119, in which occurrence of an error requiring a retry operation is examined, is achieved during the execution of the command at step 117; therefore, it is possible for the occurrence of the retry error to be watched in parallel with the execution of the command.

As described above, even though an error requiring a retry operation occurs repeatedly, in the method of the present invention, the operation does not enter into a fixed routine as in a conventional method. Therefore, a fixed rotational delay time of about one revolution time does not occur at every retry operation, and it is possible for this waiting time to be allotted effectively to the execution of another command. In other words, the idle time in the rotational delay time is allotted to a useful process execution when the error requiring a retry operation occurs repeatedly.

Figure 4:
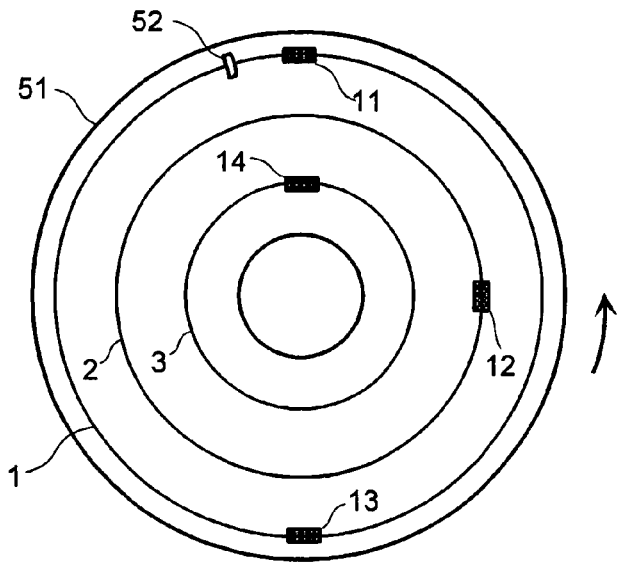
FIG. 4 is a diagram showing placement of sectors on a disk medium to which a command is executed.
Figure 5:
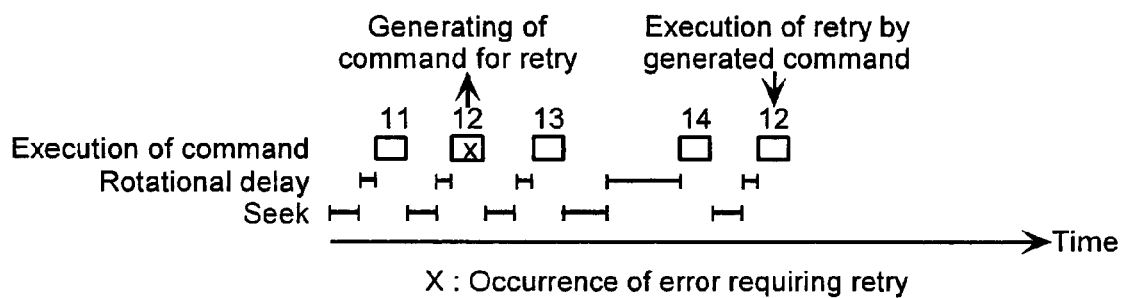
FIGS. 5(a) and 5(b) are diagrams showing an example of command execution in the case of FIG. 4 with the elapse of time.
Figure 5:
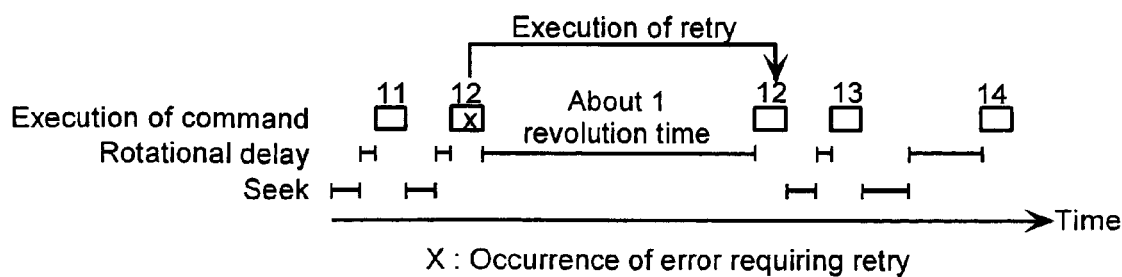

Next, a command execution process in accordance with the present invention will be explained with reference to FIG. 4 and FIG. 5. FIG. 4 is a diagram showing placement of only tracks and sectors to which a command is executed among two or more tracks formed as concentric circles on the disk medium. Tracks 1 to 3 form concentric circles on the magnetic disk medium 51 on which information is recorded. Sectors 11 and 13 are on the track 1, sector 12 is on the track 2 and sector 14 is on the track 3. Each sector 11 to 14 is placed at the position shown in FIG. 4.

Here, it is assumed that commands (whichever write or read) to sectors 11 to 13 have been accumulated in the command queue 30. First, the command to the sector 11 in which an access time of the magnetic head 52 is minimum is selected. In this case, the magnetic head 52 for the writing and reading of information has moved to the position shown in the figure, and stays on the track 1. The magnetic disk medium 51 is rotating counterclockwise, and so the sector 11 comes under the magnetic head 52 after a while. Then, the command to the sector 11 is executed.

Next, the host interface 29 selects the command to the sector 12, in which the access time of the magnetic head 52 is minimum at this time, from the command queue 30. The magnetic head 52 moves to the track 2, and when the sector 12 comes under the head, the command is executed. Here, it is assumed that an error requiring a retry operation has occurred in execution of the command to the sector 12. In response to occurrence of the error, the command generating circuit 28 generates a retry command for a first retry operation of the command to the sector 12, removes the original command to the sector 12 from the command queue 30, and adds the generated retry command to the command queue 30.

The host interface 29 then selects from the command queue 30 the command to the sector 13 in which the access time of the magnetic head 52 is minimum at this time. At this time, a new command to sector 14 from the host unit has been added to the command queue 30. Here, the magnetic head 52 seeks the track 1, and waits for the sector 13 coming on the track 1. When the sector 13 comes under the magnetic head 52, the command to the sector 13 is executed. (In following description, if no mention is made of occurrence of an error during execution of a command, the execution of the command is considered to be finished without any occurrence of an error requiring a retry operation.)

Further, the host interface 29 selects from the command queue 30 the command to the sector 14 in which the access time of the magnetic head 52 is minimum at this time. The magnetic head 52 seeks the track 3, and the command is executed. Next, the host interface 29 selects from the command queue 30 the generated retry command to the sector 12 in which the access time of the magnetic head 52 is minimum at this time. Here, parameters for the retry operation are set, and the magnetic head 52 seeks the track 2. When the sector 12 comes under the head, the command is executed. If commands to the sector 14 and 12 have finished without any error, no command remains in the command queue 30.

FIGS. 5(a) and 5(b) show examples of the command execution in the case of FIG. 4 with the elapse of time. FIG. 5(a) shows the execution method of the present invention, and FIG. 5(b) shows an example of a conventional method as a comparative example. In FIGS. 5(a) and 5(b), time passes to the right and the time occupied by each operation, namely, execution of commands, rotational delay, seek, is shown.

FIG. 5(a) shows a process procedure, in which the command to the sector 11, the command to the sector 12, the command to the sector 13, and the command to the sector 14 are executed in that order, and then the command corresponding to the retry operation to the sector 12 is executed again. In FIG. 5(b), there is a rotational delay of about one revolution time after the command to the sector 11 and the command to the sector 12 have been executed, then the retry command to the sector 12 is executed again, and afterward the command to the sector 13 and the command to the sector 14 are executed. In FIG. 5(b), when the error in the sector 12 is not recovered by one retry operation and several retry operations are required, and when a new command is sent from the host unit after the command to the sector 14, the effect of the present invention becomes still larger.

Figure 6:
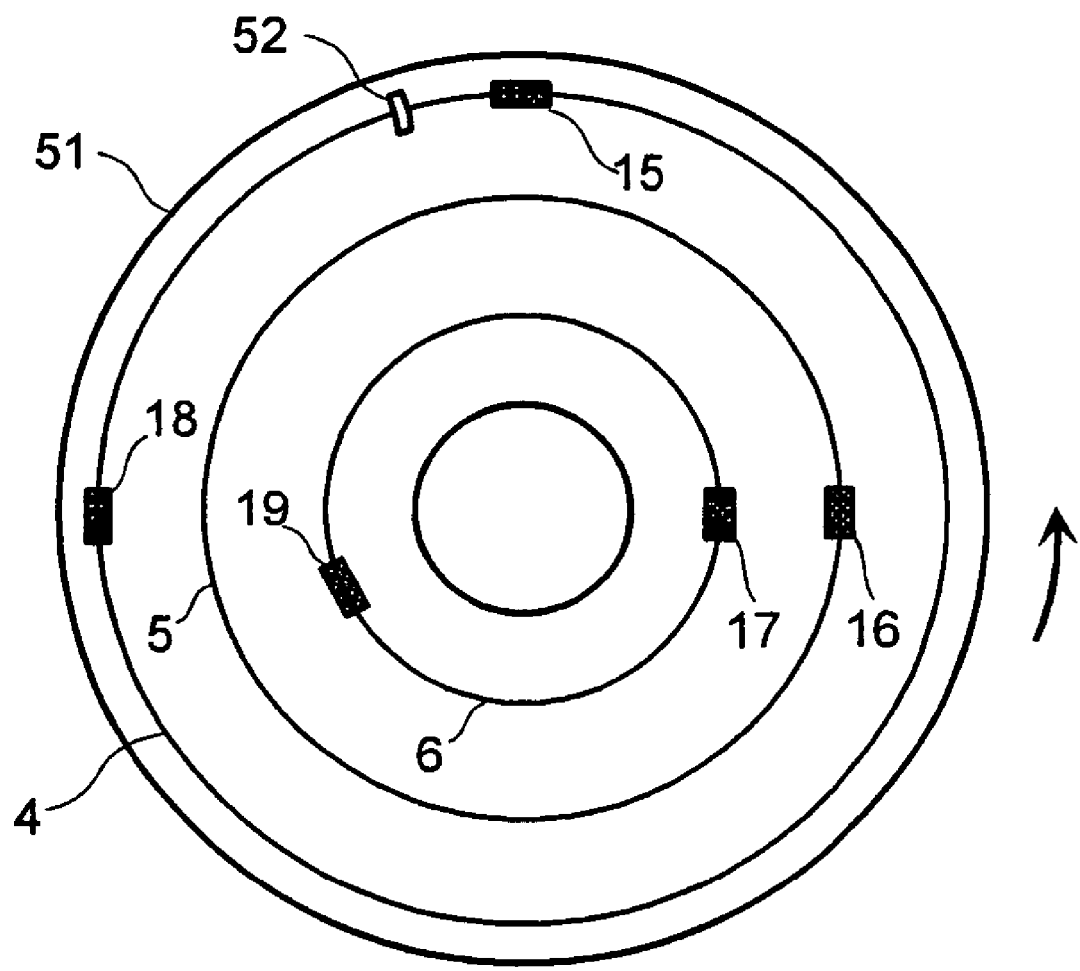
FIG. 6 is a diagram showing placement of sectors on another disk medium to which a command is executed.
Figure 7:
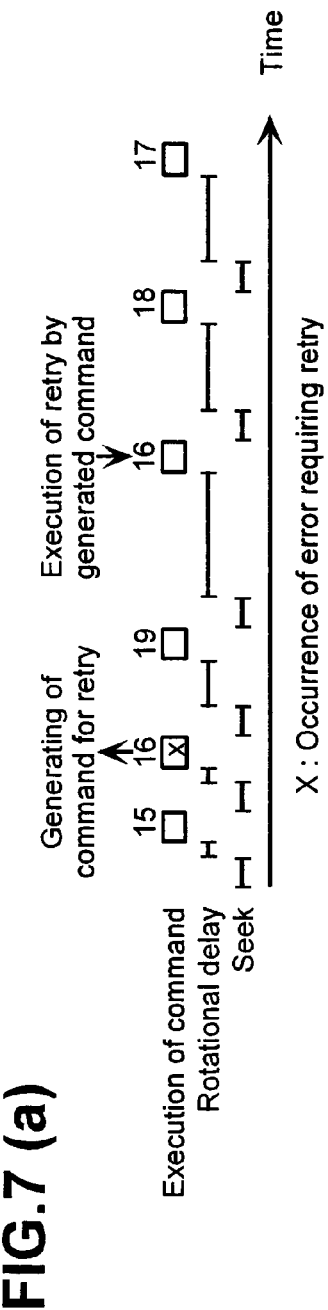
FIGS. 7(a) to 7(c) are diagrams showing an example of command execution in the case of FIG. 6 with the elapse of time.
Figure 7:
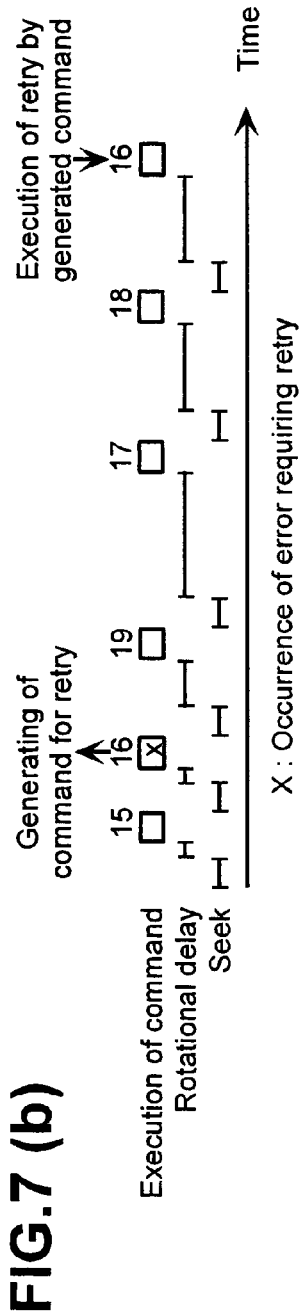
Figure 7:
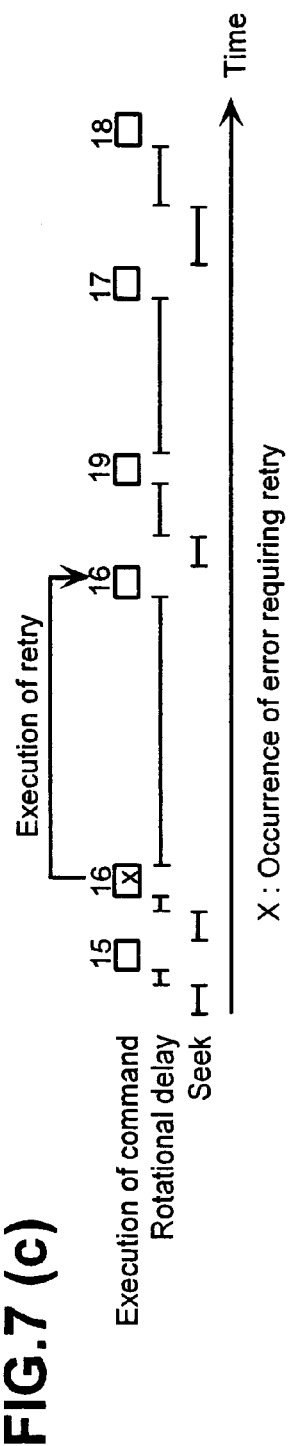

Next, another example of the command execution process will be explained with reference to FIG. 6 and FIG. 7. FIG. 6 is a diagram, similar to FIG. 4, showing placement of sectors on the disk medium to which commands are executed. Tracks 4 to 6 forms concentric circles on the magnetic disk medium 51 on which information is recorded.

Sectors 15 and 18 are on the track 4, a sector 16 is on the track 5, and sectors 17 and 19 are on the track 6. Each sector 15 to 19 is placed at the position shown in FIG. 6.

Here, it is assumed that commands, including a command to the sector 15, are in the command queue 30. First, the host interface 29 selects from the command queue 30 the command to the sector 15 in which the access time of the magnetic head 52 is minimum at this time. The magnetic head 52 seeks the track 4 and stays on it. The magnetic disk medium 51 is rotating counterclockwise, and when the sector 15 comes under the magnetic head 52 after a while, the command to the sector 15 is executed. The execution of the command to the sector 15 ends normally, and during execution of this command, commands (whichever write or read) to sectors 16 to 19 have accumulated in the command queue 30.

The host interface 29 selects from the command queue 30 the command to the sector 16 in which the access time of the magnetic head 52 is minimum at this time, and executes the command. Namely, the magnetic head 52 seeks the track 5, and when the sector 16 comes under the head, the command is executed. Here, an error requiring a retry operation has occurred in execution of the command to the sector 16. In response to this error, the command generating circuit 28 generates a retry command for a first retry operation of the command to the sector 16, removes the original command to the sector 16 from the command queue 30, and adds the generated retry command to the command queue 30.

At this time, the command corresponding to retry operation to the sector 16 and the commands to the sector 17 to the sector 19 are in the command queue 30. The host interface 29 selects from the command queue 30 the command to the sector 19 as a next command to be executed in which the access time of the magnetic head 52 is minimum. The magnetic head 52 seeks the track 6, and when the sector 19 comes under the magnetic head 52 by rotation of the magnetic disk medium 51, the command to the sector 19 is executed. Then, the host interface 29 selects from the command queue 30 a command which is executable next.

The retry command corresponding to the retry operation to the sector 16 and the commands to the sectors 17 and 18 are in the command queue 30. The command to the sector 18 is omitted from objects of selection because the access time of the magnetic head 52 from the track 6 having the sector 19 to the track 4 having the sector 18 is larger than the rotational delay time of one revolution of the magnetic disk 51 at this time. The candidate for the next operation is one of the remaining two commands that the magnetic head can access to the target sector within the rotational delay time of one revolution, namely, the retry command corresponding to the retry operation to the sector 16 and the command to the sector 17. It is a problem to select one of the two commands. In such case, in accordance with the present invention, the operation order corresponding to conditions can be selected by giving a priority to the commands.

A first method is a method in which a higher priority is given to a command to a sector in which an error requiring retry operation has occurred. In this method, by giving a higher priority to a command for a sector in which an error requiring retry operation has occurred, the retry command corresponding to the retry operation to the sector 16 is selected first. The magnetic head 52 seeks the track 5, and when the sector 16 comes under the magnetic head 52 by rotation of the magnetic disk medium 51, the retry command corresponding to retry operation to the sector 16 is executed.

If an error requiring a retry operation has occurred again in the execution of the command to the sector 16, a similar processing is executed again.

When the command to the sector 16 has been executed without any error, the commands to the sectors 17 and 18 are in the command queue 30, and the command to the sector 18 is selected, since the access time for this command is minimum at this time. The magnetic head 52 seeks the track 4 and waits for the sector 18 on the track 4. When the sector 18 comes under the magnetic head 52, the command to the sector 18 is executed. Next, the only remaining command, the command to the sector 17, is selected. The magnetic head 52 seeks the track 6, waits for coming of the sector 17 on the track 6, and the command is executed. When the commands to the sectors 18 and 17 have been executed without any error, no command remains in the command queue 30.

A second method is a method in which a lower priority is given to a command to a sector in which an error requiring a retry operation has occurred. Continuation of the above-described selection of one of two commands, the retry command corresponding to the retry operation to the sector 16 and the command to the sector 17, will be explained.

In the selection process, the candidates of a command to be selected are the retry command corresponding to the retry operation to the sector 16 and the command to the sector 17. In this second method, because a lower priority is given to a command to a sector in which an error requiring a retry operation has occurred, the command to the sector 17 is selected first. The sector 17 is in the same track 6 as the sector 19. Therefore, the magnetic head 52 does not seek, but stays continuously on the track 6, and when the sector 17 comes under the magnetic head 52 by rotation of the magnetic disk medium 51, the command is executed.

At this time, the retry command corresponding to the retry operation to the sector 16 and the command to the sector 18 are in the command queue 30. According to the priority order specified in this method, the command to the sector 18 is selected. The magnetic head 52 seeks the track 4, and waits for the coming of the sector 18 on the track 4 with rotation of the magnetic disk medium 51. When the sector 18 comes under the magnetic head 52, the command to the sector 18 is executed without error.

Next, the remaining retry command to the sector 16 is selected. The magnetic head 52 seeks to the track 5, stays on the track 5, and waits for the coming of the sector 16 with rotation of the magnetic disk medium 51. When the sector 16 comes under the magnetic head 52, the retry command corresponding to the retry operation to the sector 16 is executed. If every command has been executed without an error, no command remains in the command queue 30.

FIGS. 7(a) to 7(c) show examples of the command execution in the case of FIG. 6 with the elapse of time. Every command to be executed is to a different sector on the tracks. In these figures, time passes to the right and the time occupied by each operation, namely, the execution of the commands, the rotational delay, and seek, is shown.

FIG. 7(a) shows the passage of time in an example in which a retry command generated for a retry operation has a higher priority. As described above in connection with FIG. 6, in this example, it is understood that the command to the sector 19 on another track is executed first after an error requiring a retry operation has occurred, and then the retry command to the sector 16 is executed earlier than the commands to the sectors 17 and 18 according to the above mentioned priority order.

FIG. 7(b) shows the passage of time in an example in which a retry command generated for a retry operation has the lower priority. As described above in connection with FIG. 6, it is understood that the commands to the sectors 19, 17, and 18 are executed earlier than the retry command to the sector 16. If an error requiring a retry operation has occurred also in the sector 17, the priority of the retry command to the sector 17 is lowered because it is the criterion of the selection in this case that a lower priority is given at the time of occurrence of an error. The retry command to the sector 16 is selected earlier. However, it is possible for another criterion for selection to be set and applied.

FIG. 7(c) shows the passage of time in a conventional method, in which if an error occurs in the execution of the command to the sector 16, the retry operation is executed repeatedly, and another command is not executed until this retry operation is completed. In this method, it is understood that the process time in which all commands to the sectors 17 to 19 have been executed is longer than the process time in the cases of FIG. 7(a) and FIG. 7(b).

An example in which an error is recovered by one retry operation is described above. In the case that many retry operations are necessary to recover each error, there is also a method in which the priority order is changed depending on the state of a retry operation. For example, the priority of a retry command is lowered at the beginning, and then, when the number of times of retry operation is carried out, or when the processing time exceeds an appointed value, a higher priority is given to the retry command.

The result of an evaluation for the case in which many retry operations are necessary to recover an error will be explained in more detail with reference to FIG. 8 to FIG. 10. The basic placement of the sectors on the disk medium to which the commands are executed is as the same as the placement shown in FIG. 6. However, five sectors 18-1, 18-2, 18-3, 18-4, and 18-5 (not shown in the drawing) are located in an outer circumferential area neighboring the sector 18. The track corresponding to each sector is track 4-1, 4-2, 4-3, 4-4, and 4-5 (not shown in the drawing), respectively. With this placement, it is assumed that five times of retry operations are executed to the sector 16, and five commands to the above mentioned sectors in the outer circumferential area neighboring the sector 18 are issued in the above mentioned sector order at every revolution of the disk medium. Further, it is assumed that all the while, no command is issued to the sector 17 or to the sector 19.

The disk is rotating at 6000 revolution per minute. Accordingly, 1 revolution time is 10 ms, ¼ revolution time from the sector 15 to the sector 16 is 2.5 ms, and ½ revolution time from the sector 16 to the sector 18, or to the sectors 18-1 to 18-5 is 5 ms. It is assumed that the processing time for each sector, which includes the time of execution of writing or reading, judging whether a retry operation is required or not, and the generation of a retry command, is 0.1 ms. It is also assumed that the access time between the track 5 and one of the tracks 4 and 4-1 to 4-5 is 2 ms, and the access time between two tracks among the tracks 4 and 4-1 to 4-5 is 1 ms. The time of sorting of commands is assumed to be 0.2 to 0.8 ms according to the number of times of sorting. The processing time for receipt of a command is assumed to be 0.2 ms and is explicitly described only when a receipt processing time is necessary.

FIG. 8 is a diagram showing an example of the command execution flow and processing time in a case in which a retry operation is executed five times in the above-described embodiment. Here, during the time the magnetic disk medium rotates five times (i.e. from item No. 4 which is the first command execution to the sector 16 to item No. 39 which is the fifth retry operation), retry operations have been executed five times and the error has been recovered. Further, the execution of commands to the five sectors in the neighboring outer circumferential area of the sector 18, namely the sectors 18-1 to 18-5 (i.e. items No. 15, No. 22, No. 29, No. 36 and No. 42) has been completed. In this embodiment of the present invention, the processing time required from the beginning of processing of the sector 16 (item No. 4) to the end of processing of the sector 18-5 (item No. 42) is 55.1 ms.

FIG. 9 is a diagram showing a comparative example of the command execution flow and the processing time in a case in which the example of FIG. 8 is executed by a conventional method. Here, the processing of the sector 16 and the retry processing to the sector 16 (items No. 4 to No. 14) are executed first, and then the command to the sector 18 and the commands to the sectors 18-1 to 18-5 received during the execution of the retry processing are executed (item No. 15 to No. 33). Therefore, it takes 5 revolutions for the retry operation and 5 revolutions for execution of the subsequent commands. That is, it takes the sum of 10 revolutions. In the conventional method, the processing time required from the beginning of processing of the sector 16 (item No. 4) to the end of processing of the sector 18-5 (item No. 42) is 105.1 ms. Namely, in the comparative example which employs the conventional method, approximately twice the processing time is required in comparison with the time of 55.1 ms obtained with the embodiment of the present invention.

An example in which the effect of the present invention is considered from another point of view will be explained with reference to FIG. 10 in comparison with FIG. 8. FIG. 10 is a diagram showing a command execution flow and processing time in a case without a retry operation to the sector 16 in the embodiment of FIG. 8. It is the same as the example of FIG. 8, except that there is no retry operation to the sector 16. It is understood from FIG. 10 that the processing time required from the beginning of processing of the sector 16 (item No. 4) to the end of processing of the sector 18-5 (item No. 33) is 55.1 ms. This processing time is the same as the processing time calculated in the example of FIG. 8. It can be said that, "the rotational delay time required by the retry operation is allocated effectively to other command processing, and idle rotational delay time is eliminated" by the retry processing method shown in FIG. 8 as an example of the present invention.

As described above, the present invention produces larger effect when an error is not recovered by one command retry, such that several retry operations are necessary, and when a new command is transferred always from the host unit.

Next, an operation in which two or more retry operations are executed to a sector will be explained with reference to FIG. 11 and FIG. 12.

Figure 11:
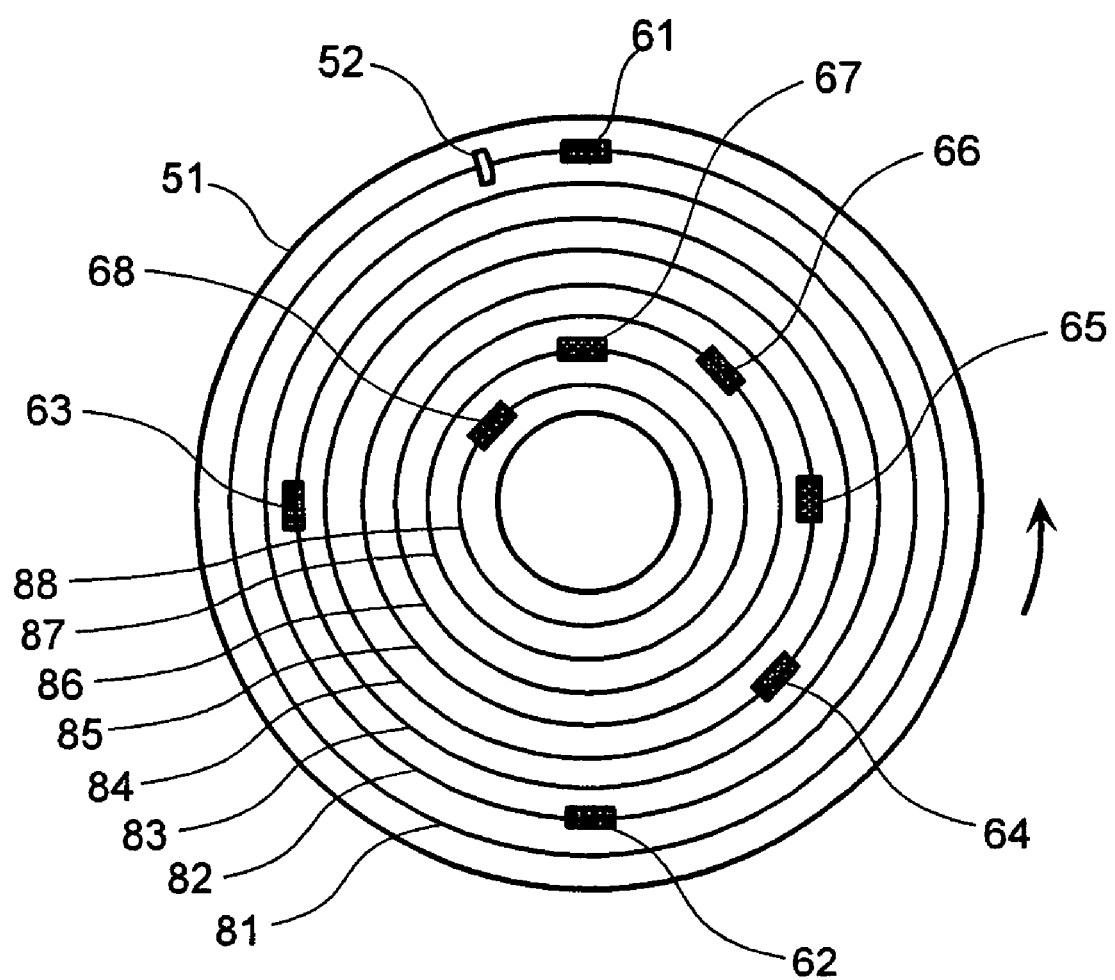
FIG. 11 is a diagram showing placement of sectors on a disk medium to which a command is executed in a case where two or more retry operations are executed to a sector.

FIG. 11 is a diagram showing only tracks and sectors to which a command is to be executed among two or more tracks forming concentric circles on the disk medium, similar to FIG. 4. Tracks 81 to 88 of form concentric circles on the magnetic disk medium 51 on which information is recorded. Further, sectors 61, 62, 63, 64, 65, 66, 67, and 68 are on the tracks 81, 82, 83, 84, 85, 86, 87, and 88, respectively. Each sector 61 to 68 is located at the position shown in FIG. 11. Here, it is assumed that commands (whichever write or read) to the sector 61 to sector 63 have been accumulated in the command queue 30.

The host interface 29 selects from the command queue 30 the command to the sector 61 in which the access time of the magnetic head 52 is minimum at this time. Then, the magnetic head 52 for writing and reading information seeks the position shown in the drawing, and stays on the track 81. The magnetic disk medium 51 is rotating counterclockwise; therefore, the sector 61 comes under the magnetic head 52 after a while at which time, the command to the sector 61 is executed.

Next, the host interface 29 selects from the command queue 30 the command to the sector 62 in which the access time of the magnetic head 52 is minimum at this time. The magnetic head 52 seeks the track 82, and when the sector 62 comes under the magnetic head, the command is executed. Here, it is assumed that an error requiring a retry operation has occurred. In response to the occurrence of an error, the command generating circuit 28 generates a retry command for the first retry operation of the command to the sector 62, removes the original command to the sector 62 from the command queue 30, and adds the generated retry command to the command queue 30.

At this time, the command to the sector 63 and the command for the first retry operation to the sector 62 are in the command queue 30. Here, the host interface 29 selects from the command queue 30 the command to the sector 63 in which the access time of the magnetic head 52 is minimum at this time. Then, the magnetic head 52 seeks the track 83, and waits for the sector 63 on the track 83. When the sector 63 comes under the magnetic head 52, the command to the sector 63 is executed.

Next, the host interface 29 selects from the command queue 30 the retry command for the first retry operation to the sector 62 in which the access time of the magnetic head 52 is minimum at this time. The magnetic head 52 seeks the track 82 according to the parameters set for the first retry operation, and waits for the sector 62 on the track 82. When the sector 62 comes under the head, the first retry command to the sector 62 is executed. At this time, it is assumed that an error requiring a retry operation has occurred again. In response to the occurrence of this error, the command generating circuit 28 generates a retry command for the second retry operation of the command to the sector 62, removes the first retry command to the sector 62 from the command queue 30, and adds the newly generated second retry command to the command queue 30.

At this time, it is assumed that a new command to the sector 64 has been added to the command queue 30 from the host unit 300. In this stage, the command to the sector 64 and the second retry command to the sector 62 are in the command queue. The host interface 29 selects from the command queue 30 the command to the sector 64 in which the access time of the magnetic head 52 is minimum at this time. The magnetic head 52 seeks the track 84 and waits for the sector 64 on the track 84. When the sector 64 comes under the magnetic head 52, the command to the sector 64 is executed.

At this time, it is assumed that a new command to the sector 65 has been added to the command queue 30 from the host unit 300. In this stage, the command to the sector 65 and the second retry command to the sector 62 are in the command queue. The host interface 29 selects from the command queue 30 the second retry command to the sector 62 in which the access time of the magnetic head 52 is minimum at this time. The magnetic head 52 seeks the track 82 according to the parameters set for the second retry operation and waits for the sector 62 on the track 82. When the sector 62 comes under the magnetic head 52, the second retry command to the sector 62 is executed.

At this time, it is assumed that an error requiring a retry operation has occurred again. In response to the occurrence of this error, the command generating circuit 28 generates a retry command for the third retry operation of the command to the sector 62, removes the second retry command to the sector 62 from the command queue 30, and adds the newly generated third retry command to the command queue 30. At this time, the command to the sector 65 and the third retry command to the sector 62 are in the command queue 30. The host interface 29 selects from the command queue 30 the command to the sector 65 in which the access time of the magnetic head 52 is minimum at this time. Then, the magnetic head 52 seeks the track 85. When the sector 65 comes under the magnetic head 52, the command to the sector 65 is executed.

At this time, it is assumed that a new command to the sector 66 has been added to the command queue 30 from the host unit 300. Accordingly, the command to the sector 66 and the third retry command to the sector 62 are in the command queue. The host interface 29 selects from the command queue 30 the third retry command to the sector 62 in which the access time of the magnetic head 52 is minimum at this time. The magnetic head 52 seeks the track 82 according to the parameters set for the third retry operation and waits for the sector 62. When the sector 62 comes under the magnetic head 52, the third retry command to the sector 62 is executed.

At this time, it is assumed that an error requiring a retry operation has occurred again. In response to the occurrence of this error, the command generating circuit 28 generates a retry command for the fourth retry operation of the command to the sector 62, removes the third retry command to the sector 62 from the command queue 30, and adds the newly generated fourth retry command to the command queue 30. At this time, the command to the sector 66 and the fourth retry command to the sector 62 are in the command queue 30. The host interface 29 selects from the command queue 30 the command to the sector 66 in which the access time of the magnetic head 52 is minimum at this time. Then, the magnetic head 52 seeks the track 86, and waits for the sector 66 on the track 86. When the sector 66 comes under the magnetic head 52, the command to the sector 66 is executed.

At this time, it is assumed that new commands to the sector 67 and sector 68 have been added to the command queue 30 from the host unit 300. Accordingly, the command to the sector 67, the command to the sector 68, and the fourth retry command to the sector 62 are in the command queue. The host interface 29 selects from the command queue 30 the fourth retry command to the sector 62 in which the access time of the magnetic head 52 is minimum at this time. The magnetic head 52 seeks the track 82 according to the parameters set for the fourth retry operation. When the sector 62 comes under the magnetic head 52, the fourth retry command to the sector 62 is executed.

At this time, it is assumed that an error requiring a retry operation has occurred again. In response to the occurrence of this error, the command generating circuit 28 generates a retry command for the fifth retry operation of the command to the sector 62, removes the fourth retry command to the sector 62 from the command queue 30, and adds the newly generated fifth retry command to the command queue 30. At this time, the command to the sector 67, the command to the sector 68, and the fifth retry command to the sector 62 are in the command queue 30. The host interface 29 selects from the command queue 30 the command to the sector 68 in which the access time of the magnetic head 52 is minimum at this time. Then, the magnetic head 52 seeks the track 88.

When the sector 68 comes under the magnetic head 52, the command to the sector 68 is executed and the execution finishes with no error.

At this time, the command to the sector 67 and the fifth retry command to the sector 62 are in the command queue 30. The host interface 29 selects from the command queue 30 the command to the sector 67 in which the access time of the magnetic head 52 is minimum at this time. Then, the magnetic head 52 seeks the track 87 and waits for the sector 67 on the track 87. When the sector 67 comes under the magnetic head 52, the command to the sector 67 is executed. At this time, only the fifth retry command to the sector 62 is in the command queue 30. The host interface 29 selects this command from the command queue 30. Then, the magnetic head 52 seeks the track 82 according to the parameters set for the fifth retry operation, and when the sector 62 comes under the magnetic head 52, the fifth retry command to the sector 62 is executed.

At this time, it is assumed that an error requiring a retry operation has occurred again. In response to the occurrence of this error, the command generating circuit 28 generates a retry command for the sixth retry operation of the command to the sector 62, removes the fifth retry command to the sector 62 from the command queue 30, and adds the newly generated sixth retry command to the command queue 30. At this time, only the sixth retry command to the sector 62 is in the command queue 30. The host interface 29 selects this command from the command queue 30. Then, the magnetic head 52 stays on the track 82 according to the parameters set for the sixth retry operation and waits for the sector 62 on the track 82. When the sector 62 comes under the magnetic head 52, the sixth retry command to the sector 62 is executed.

As described above, even though there is a sector which requires two or more retry operations, commands to other sectors can be executed by utilizing time between executions of each retry operation. In this case, the command to the sector in which an error requiring a retry operation does not occur can be executed with little influence by the retry operation of the command to the sector in which an error requiring a retry operation has occurred, and the retry operation of the command to the sector in which an error requiring a retry operation has occurred can be executed with little influence by the execution of the command to the sector in which an error requiring retry operation does not occur.

Figure 12:
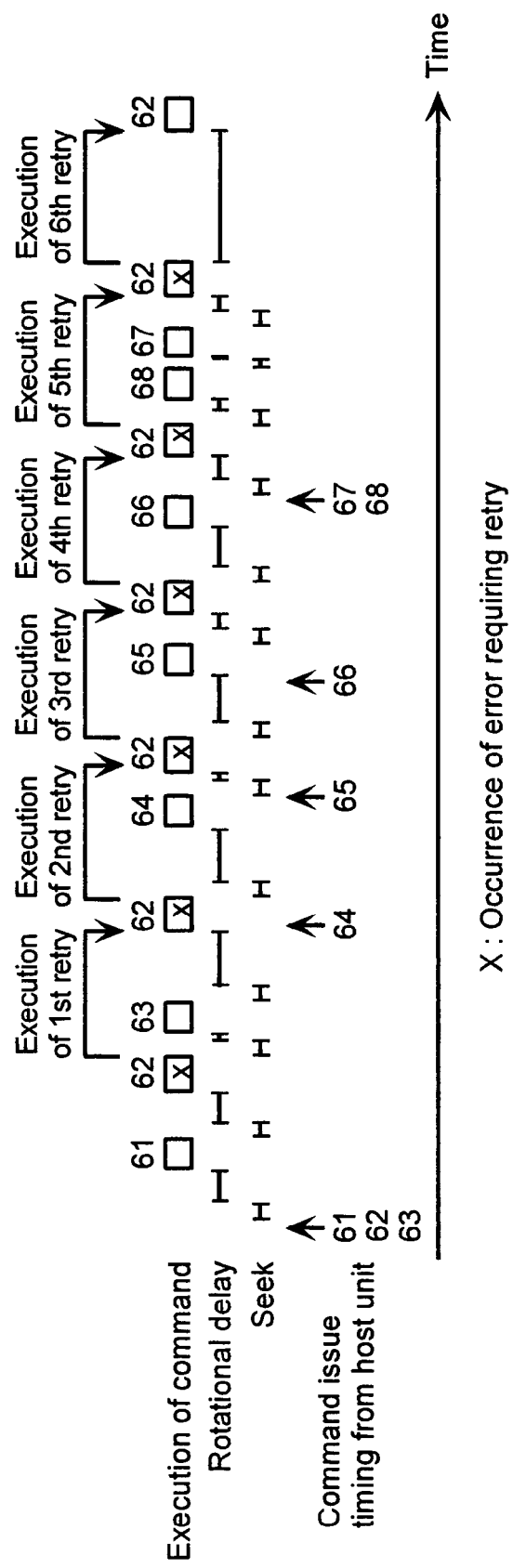
FIG. 12 is a diagram showing an example of command execution in the case of FIG. 11 with the elapse of time.

FIG. 12 shows an example of the commands explained with reference to FIG. 11 with the elapse of time. In FIG. 12, time passes to the right and the time occupied by each operation, namely, the execution of the commands, the rotational delay, and seek, is shown. Further, command issued timings from the host unit are shown.

FIG. 12 shows the processing procedure in which the commands, from the command to the sector 61 to the command to the sector 68, are executed. It is understood that the commands to the other sectors, sector 63 to sector 68, are executed between executions of the retry command to the sector 62. It is possible for two or more commands to be executed between the executions of a retry operation, such as the commands to the sectors 67 and 68, if it is judged to be executable. Further, in the example of FIG. 11 and FIG. 12, if the number of times of execution of a retry operation is limited to five times, the command generating circuit 28 does not generate the sixth retry command and the execution of the retry command is brought to an end after five times.

Next, an operation in a case in which two errors requiring retry operations have occurred in different tracks will be explained with reference to FIG. 13 and FIG. 14.

Figure 13:
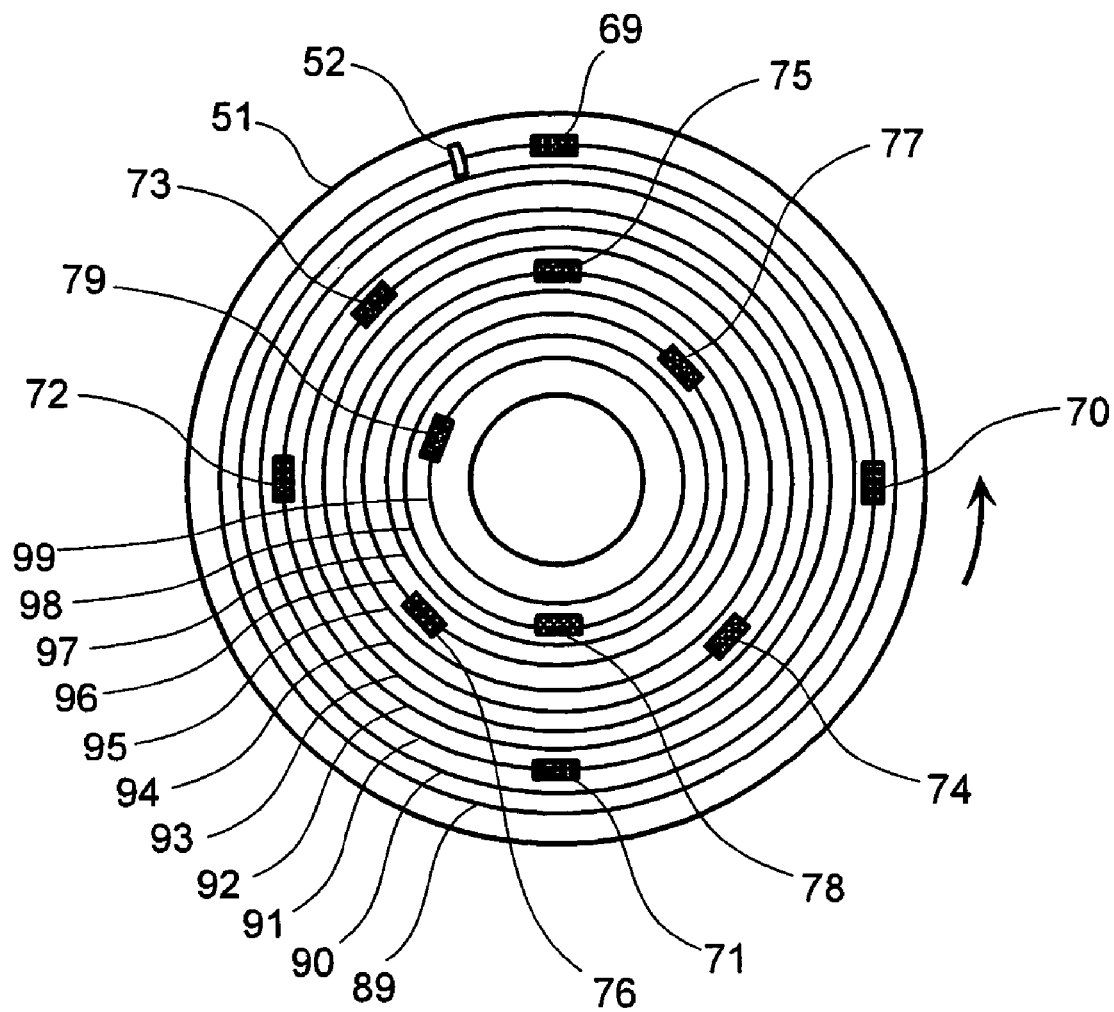
FIG. 13 is a diagram showing placement of sectors on a disk medium to which a command is executed in the case where two or more retry operations are executed to two or more sectors.

FIG. 13 is a diagram showing placement of only those tracks and sectors to which a command is executed among two or more tracks forming concentric circles on the disk medium, similar to FIG. 4. Tracks 89 to 99 form concentric circles on the magnetic disk medium 51 on which information is recorded. Further, sectors 69, 70, 71, 72, 73, 74, 75, 76, 77, 78 and 79 are on the tracks 89, 90, 91, 92, 93, 94, 95, 96, 97, 98 and 99, respectively. Each sector 69 to 79 is located at the position shown in FIG. 13.

At this time, commands (whichever write or read) to the sector 69 to sector 72 have been accumulated in the command queue 30. First, the host interface 29 selects the command to the sector 69 in which the access time of the magnetic head 52 is minimum at this time. Then, the magnetic head 52 for writing and reading of information seeks the position shown in the drawing, and stays on the track 89. The magnetic disk medium 51 is rotating counterclockwise; therefore, the sector 69 comes under the magnetic head 52 after a while. Then, the command to the sector 69 is executed.

Next, the host interface 29 selects from the command queue 30 the command to the sector 70 in which the access time of the magnetic head 52 is minimum at this time. The magnetic head 52 seeks the track 90, and when the sector 70 comes under the magnetic head 52, the command is executed. Here, it is assumed that an error requiring a retry operation has occurred in the execution of the command to the sector 70. The command generating circuit 28 generates a retry command for the first retry operation of the command to the sector 70, removes the original command to the sector 70 from the command queue 30, and adds the generated retry command to the command queue 30.

At this time, the command to the sector 71, the command to the sector 72, and the command for the first retry operation to the sector 70 are in the command queue. The host interface 29 selects from the command queue 30 the command to the sector 71 in which the access time of the magnetic head 52 is minimum at this time. Then, the magnetic head 52 seeks the track 91 and waits for the sector 71 on the track 91. When the sector 71 comes under the magnetic head 52, the command to the sector 71 is executed.

At this time, the command to the sector 72 and the command for the first retry operation to the sector 70 are in the command queue. The host interface 29 selects from the command queue 30 the command to the sector 72 in which the access time of the magnetic head 52 is minimum at this time. The magnetic head 52 seeks the track 92, and when the sector 72 comes under the magnetic head 52, the command to the sector 72 is executed. Here, it is assumed that an error requiring a retry operation has occurred in the execution of the command to the sector 72. The command generating circuit 28 generates a retry command for the first retry operation of the command to the sector 72, removes the original command to the sector 72 from the command queue 30, and adds the generated retry command to the command queue 30.

At this time, it is assumed that new commands to the sector 73 and sector 74 are added to the command queue 30 from the host unit 300. Accordingly, the command to the sector 73, the command to the sector 74, the command for the first retry operation to the sector 70, and the command for the first retry operation to the sector 72 are in the command queue 30. The host interface 29 selects from the command queue 30 the command to the sector 73 in which the access time of the magnetic head 52 is minimum at this time. Then, the magnetic head 52 seeks the track 93 and waits for the sector 73 on the track 93. When the sector 73 comes under the magnetic head 52, the command to the sector 73 is executed.

At this time, the command to the sector 74, the command for the first retry operation to the sector 70, and the command for the first retry operation to the sector 72 are in the command queue 30. The host interface 29 selects from the command queue 30 the first retry command to the sector 70 in which the access time of the magnetic head 52 is minimum at this time. Then, according to the parameters set for the first retry operation, the magnetic head 52 seeks the track 90 and waits for the sector 70 on the track 90. When the sector 70 comes under the magnetic head 52, the first retry command to the sector 70 is executed.

At this time, it is assumed that an error requiring a retry operation has occurred again. The command generating circuit 28 generates a retry command for the second retry operation of the command to the sector 70, removes the first retry command to the sector 70 from the command queue 30, and adds the newly generated second retry command to the command queue 30. At this time, the command to the sector 74, the command for the second retry operation to the sector 70, and the first retry command to the sector 72 are in the command queue 30. The host interface 29 selects from the command queue 30 the command to the sector 74 in which the access time of the magnetic head 52 is minimum at this time. Then, the magnetic head 52 seeks the track 94, and, when the sector 74 comes under the magnetic head 52, the command to the sector 74 is executed.

At this time, the command for the second retry operation to the sector 70 and the command for the first retry operation to the sector 72 are in the command queue 30. The host interface 29 selects from the command queue 30 the first retry command to the sector 72 in which the access time of the magnetic head 52 is minimum at this time. Then, the magnetic head 52 seeks the track 92 according to the parameters set for the first retry operation, and, when the sector 72 comes under the magnetic head 52, the first retry command to the sector 72 is executed.

At this time, it is assumed that an error requiring retry operation has occurred again. The command generating circuit 28 generates a retry command for the second retry operation of the command to the sector 72, removes the first retry command to the sector 72 from the command queue 30, and adds the newly generated second retry command to the command queue 30. This process flow is based on the flow shown in FIG. 3 at step 118 in which the command removed from the command queue is performed at each branch after step 119 in which occurrence of an error requiring a retry operation is examined. When a retry operation is required, the steps of generating a command, adding the command to the command queue and removing the original command are performed by the command generating circuit 28.

At this time, it is assumed that new commands to the sector 75 and sector 76 are added to the command queue 30 from the host unit 300. Accordingly, the command to the sector 75, the command to the sector 76, the command for the second retry operation to the sector 70, and the command for the second retry operation to the sector 72 are in the command queue 30. The host interface 29 selects the command to the sector 75 as the next executable command from the command queue 30. Then, the magnetic head 52 seeks the track 95 and waits for the sector 75 on the track 95. When the sector 75 comes under the magnetic head 52, the command to the sector 75 is executed.

At this time, the command to the sector 76, the command for the second retry operation to the sector 70, and the command for the second retry operation to the sector 72 are in the command queue 30. The host interface 29 selects from the command queue 30 the second retry command to the sector 70 in which the access time of the magnetic head 52 is minimum at this time. Then, the magnetic head 52 seeks the track 90 according to the parameters set for the second retry operation, and, when the sector 70 comes under the magnetic head 52, the second retry command to the sector 70 is executed.

At this time, it is assumed that an error requiring a retry operation has occurred again. The command generating circuit 28 generates a retry command for the third retry operation of the command to the sector 70, removes the second retry command to the sector 70 from the command queue 30, and adds the newly generated third retry command to the command queue 30.

At this time, the command to the sector 76, the command for the third retry operation to the sector 70, and the command for the second retry operation to the sector 72 are in the command queue 30. The host interface 29 selects from the command queue 30 the command to the sector 76 in which the access time of the magnetic head 52 is minimum at this time. Then, the magnetic head 52 seeks to the track 96 and waits for the sector 76 on the track 96. When the sector 76 comes under the magnetic head 52, the command to the sector 76 is executed.

At this time, the command for the third retry operation to the sector 70 and the command for the second retry operation to the sector 72 are in the command queue 30. The host interface 29 selects from the command queue 30 the second retry command to the sector 72 in which the access time of the magnetic head 52 is minimum at this time. Then, the magnetic head 52 seeks the track 92 according to the parameters set for the second retry operation and waits for the sector 72 on the track 92. When the sector 72 comes under the magnetic head 52, the second retry command to the sector 72 is executed.

At this time, it is assumed that new commands to the sector 77, the sector 78 and the sector 79 are added to the command queue 30 from the host unit 300. Accordingly, the command to the sector 77, the command to the sector 78, the command to the sector 79, and the command for the third retry operation to the sector 70 are in the command queue 30. The host interface 29 selects from the command queue 30 the command to the sector 77 in which the access time of the magnetic head 52 is minimum at this time. Then, the magnetic head 52 seeks the track 97 and waits for the sector 77 on the track 97. When the sector 77 comes under the magnetic head 52, the command to the sector 77 is executed.

At this time, the command to the sector 78, the command to the sector 79, and the command for the third retry operation to the sector 70 are in the command queue 30. The host interface 29 selects from the command queue 30 the third retry command to the sector 70 in which the access time of the magnetic head 52 is minimum at this time. Then, the magnetic head 52 seeks the track 90 according to the parameters set for the third retry operation, and when the sector 70 comes under the magnetic head 52, the third retry command to the sector 70 is executed. At this time, it is assumed that an error requiring a retry operation has occurred again. The command generating circuit 28 generates a retry command for the fourth retry operation of the command to the sector 70, removes the third retry command to the sector 70 from the command queue 30, and adds the newly generated fourth retry command to the command queue 30.

At this time, the command to the sector 78, the command to the sector 79, and the command for the fourth retry operation to the sector 70 are in the command queue 30. The host interface 29 selects from the command queue 30 the command to the sector 78 in which the access time of the magnetic head 52 is minimum at this time. Then, the magnetic head 52 seeks the track 98 and waits for the sector 78 on the track 98. When the sector 78 comes under the magnetic head 52, the command to the sector 78 is executed. At this time, the command to the sector 79 and the command for the fourth retry operation to the sector 70 are in the command queue 30. The host interface 29 selects from the command queue 30 the command to the sector 79 in which access time of the magnetic head 52 is minimum at this time. Then, the magnetic head 52 seeks the track 99. When the sector 79 comes under the magnetic head 52, the command to the sector 79 is executed.

At this time, the command for the fourth retry operation to the sector 70 is in the command queue 30. The host interface 29 selects the only remaining fourth retry command to the sector 70 from the command queue 30. Then, the magnetic head 52 seeks the track 90 according to the parameters set for the fourth retry operation, and when the sector 70 comes under the magnetic head 52, the fourth retry command to the sector 70 is executed.

As described above, even though two or more retry operations to two or more sectors are required, the operation is executable. Moreover, because each retry information is held in each retry command, it is possible to execute the retry operation using parameters corresponding to each retry operation.

Figure 14:
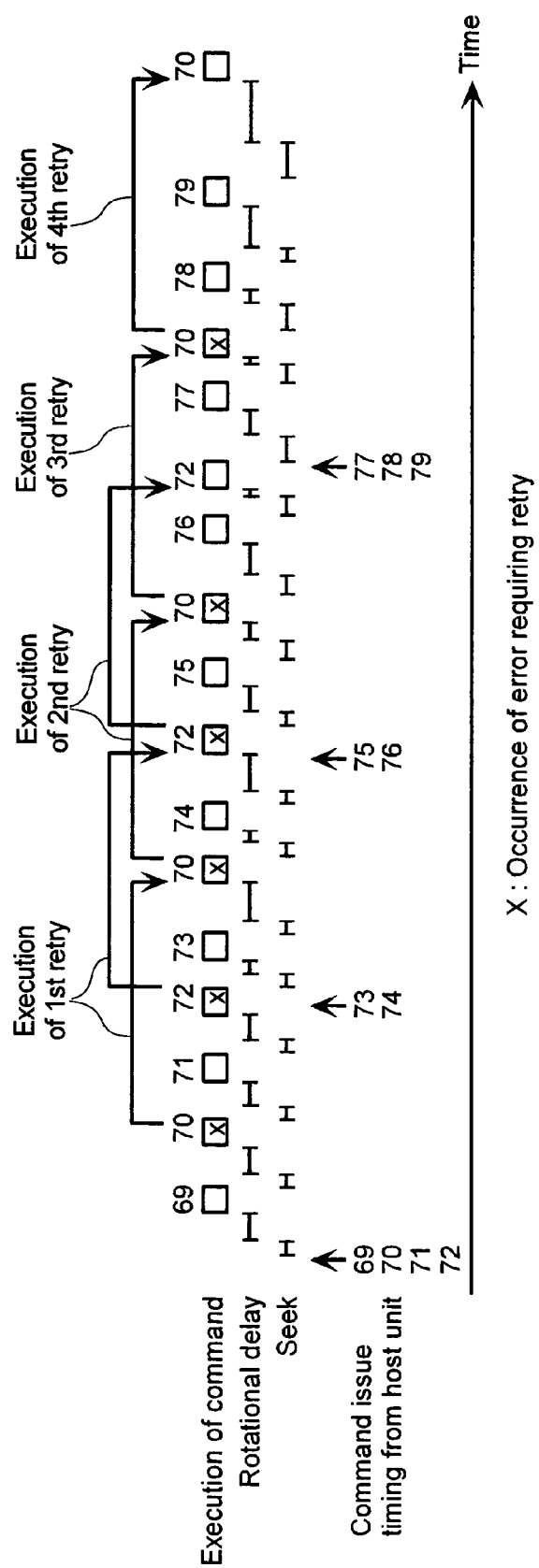
FIG. 14 is a diagram showing an example of command execution in the case of FIG. 13 with the elapse of time.

FIG. 14 shows an example of the commands explained with reference to FIG. 13 with the elapse of time. In FIG. 14, time passes to the right and time occupied by each operation, namely, the execution of the commands, the rotational delay, and seek, is shown. Further, command issued timings from the host unit are shown.

FIG. 14 shows the processing procedure in which the commands, from the command to the sector 69 to the command to the sector 79, are executed. It is understood that the commands to the other sectors, sector 71 to sector 79, are executed between executions of the retry commands to the sector 70 and sector 72. It is also possible for two or more commands to be executed between the executions of a retry operation. Furthermore, it is also possible for two or more retry commands to be generated.

The preferred embodiment has been described with the assumption that new commands from the host unit 300 were added after execution of each command. However, in practice, the commands may be added at any timing, and the host interface 29 operates to select a command to be executed each time a command is added from the host unit 300.

Figure 15:
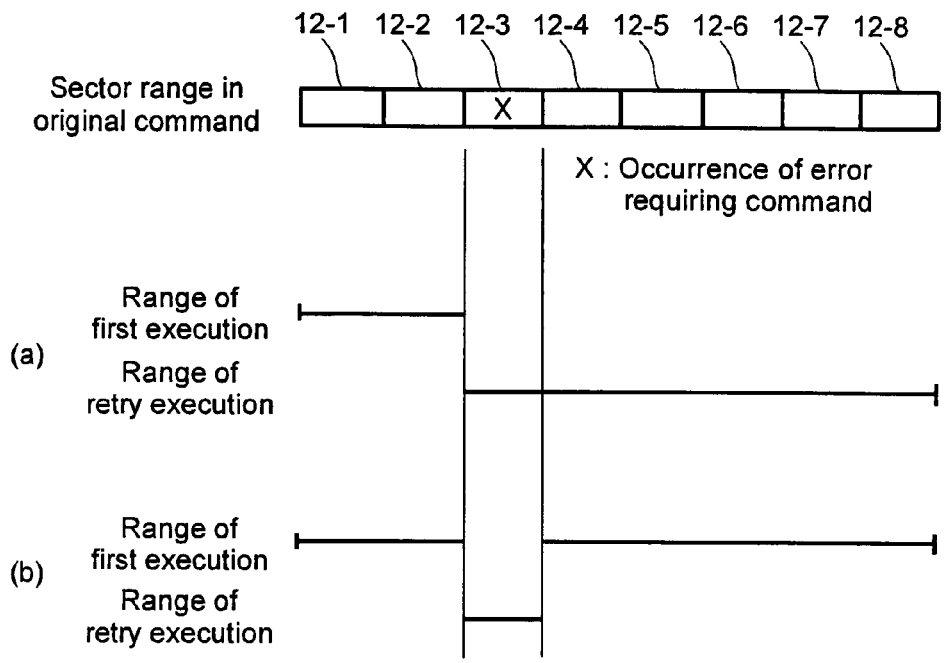
FIG. 15 is a diagram illustrating a method of dividing a retry command in a case where sectors are constituted as a block.

FIG. 15 illustrates division of a retry command in the case where the sector 12 shown in FIG. 4 is not a sector, but is constituted as a block comprising two or more successive sectors. In this case, the block comprises eight sectors, sector 12-1 to sector 12-8, and it is assumed that an error requiring a retry operation has occurred in the sector 12-3. In this case, two methods for generating a retry command, (a), (b) are considered. In method (a), sectors after the error sector 12-3 are treated as a group, a retry command is generated for the sector 12-3 to sector 12-8, and the retry operation is executed. In method (b), the original command is executed to sectors after the error sector 12-3, a retry command is generated only for the error sector 12-3 and the retry operation is executed. Even in this case, a basic unit of recording and reproducing information is a sector, and this case is an example in which, by partially treating the sectors as a group, the retry operation is executed.

Besides the methods (a), (b) of FIG. 15, there is another method in which, for a retry operation, the block comprising sectors from 12-1 to 12-8 is not divided, a retry command is generated for the sector 12-1 to sector 12-8, and the retry operation is executed. Even in this case, a basic unit of recording and reproducing information is a sector, and this case is an example in which, by treating two or more basic units as a block, the retry operation is executed.

As described above, the hard disk drive 201 of the present invention records and reproduces information with a sector unit and receives commands to record or reproduce information from the host unit 300. The command received from the host unit 300 is executed, and if an error requiring a retry operation has occurred, the hard disk controller 100 generates a new command for a retry operation. Whether a retry operation has occurred or not, new commands are sent from the host unit 300. It is possible for the other commands to be executed between executions of a retry command by treating these commands and the retry command equally.

Namely, although a command to record or reproduce information is sent from the host unit 300 to the hard disk drive 201, the same command is executed two or more times to the same sector, and other commands to record or reproduce information are executed while waiting for execution of a command. In execution of the other commands to record or reproduce information, it is possible that the execution accompanies seeking of the magnetic head 52 in which the head moves to another track (or cylinder) and head change occurs in which the present head is switched to another head on another surface of the magnetic disk medium.

As the hard disk controller, by using the hard disk controller 101 (FIG. 1) or 102 (FIG. 2) in the above described embodiment of the present invention, or by using a hard disk controller having another constitution of the present invention in which priority to execute the command is added to the retry command generated when an error requiring a retry operation has occurred, a hard disk drive can be obtained, in which deterioration of time performance to access target information is decreased as a whole, even if an error requiring a retry operation occurs.

In the embodiment described above, the state of one surface of the magnetic disk medium 51 has been described. However, the present invention is similarly applicable to a hard disk drive having two or more disk surfaces (where two or more magnetic heads 52 are also necessary).

In the foregoing consideration of the embodiments, a command from the host unit has been described as a command which is directed to one sector; however, the present invention is applicable to a command which is directed to two or more successive sectors easily by dividing the command on two or more sectors in front and behind at a sector in which an error requiring a retry operation has occurred.

Further, retry information (the number of times of retry, for example) is added to the command which is generated and added according to the occurrence of the error requiring a retry operation. Therefore, it is also possible for parameters for recording and reproducing at the retry operation to be changed based on that retry information, so that the performance of recording and reproducing at the retry operation is improved.

The present method is used easily in combination with conventional command queue sorting technology (for example, a method disclosed in the JP-A-08-329589, in which the command queue is sorted when an error requiring a retry operation has not occurred).

To execute two commands of which one is a command to a sector in which an error requiring a retry operation has occurred, and another is a command to a sector which is a neighbor sector in the radius direction of the error sector, a processing time of more than one revolution time is necessary. The order of the access to the commands depends on the algorithm for sorting the command queue. In this case, various situations are possible. For example, it may be desirable for the sector in which the error requiring a retry operation has occurred to be recovered as soon as possible by accessing it every time. Conversely, based on a consideration that some recovering time is required for the sector in which an error requiring a retry operation has occurred, a higher priority may be given to a command which has not been executed, namely a command to a sector in which an error requiring a retry operation has not occurred. Further, it is possible for a low priority to be given at the beginning, for the priority to be raised increasingly according to the time from the occurrence of the error requiring a retry operation, and, when it takes a long time from the occurrence of the error requiring a retry operation, the command can be executed at every revolution to finish the retry operation within an appointed time.

By giving priority to both commands together, the retry command generated according to the occurrence of the error requiring a retry operation and the other command sent from the host unit, and by updating the priority, the present invention can accommodate the situation described above easily and can determine an efficient execution order in the retry operation.

Additionally, information concerning an error requiring a retry operation is stored and access to the other sector is made possible between the occurrence of the error and the next recording or reproducing, so that the idle time can be decreased and the access time of the whole recording and reproducing information system can be shortened.

Furthermore, the performance of recording and reproducing can be improved by changing the parameters for recording and reproducing at the recording and reproducing information from the sector in which the error requiring a retry operation has occurred according to the stored information concerning the error requiring a retry operation. Therefore, even though an error requiring a retry operation has occurred, the performance of recording and reproducing information can be improved in the information recording and reproducing device having a disk recording medium.

The above explanation of the present invention has referred in detail to an example of the use of a hard disk drive. However, the present invention is applicable to an information recording and reproducing device having a disk recording medium in general.

What is claimed is:

1. A disk device comprising:
   a rotatable disk having sectors for storing information;
   a head for reading the information from the disk and writing the information to the disk; and
   a controller for receiving and executing commands from a host device to a first sector of the sectors between occurrence of error on a second sector of the sectors and execution of a retry command to the second sector, wherein
   the first sector and the second sector are on different tracks of the disk.

2. The disk device according to claim 1, wherein the controller detects the occurrence of the error and generates the retry command to the second sector.

3. The disk device according to claim 1, wherein the controller is capable of receiving a new command to a third sector from the host device during execution of the retry command to the second sector.

4. The disk device according to claim 1, wherein the controller is capable of changing sequence of executing received commands including the retry command.

5. The disk device according to claim 4, wherein the controller changes the sequence of executing received commands on the basis of access time of the head to the sectors.

6. A controller for controlling a disk device which has a disk for storing information and a head for reading the information from the disk and writing the information to the disk, wherein
   the controller receives and executes commands from a host device to a first sector of the sectors between occurrence of error on a second sector of the sectors and execution of a retry command to the second sector, and wherein
   the first sector and the second sector are on different tracks of the disk.

7. The controller according to claim 6, wherein the controller detects the occurrence of the error and generates the retry command to the second sector.

8. The controller according to claim 6, wherein the controller is capable of receiving a new command to a third sector from the host device during execution of the retry command to the second sector.

9. The controller according to claim 6, wherein the controller is capable of changing sequence of executing received commands including the retry command.

10. The controller according to claim 9, wherein the controller changes the sequence of executing received commands on the basis of access time of the head to the sectors.

* * * * *